(12) United States Patent
Sato

(10) Patent No.: US 8,514,148 B2
(45) Date of Patent: Aug. 20, 2013

(54) HEAD MOUNT DISPLAY

(75) Inventor: Tomohiro Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 682 days.

(21) Appl. No.: 12/659,338

(22) Filed: Mar. 4, 2010

(65) Prior Publication Data

US 2010/0225566 A1     Sep. 9, 2010

(30) Foreign Application Priority Data

Mar. 9, 2009   (JP) .................... 2009-055575

(51) Int. Cl.
  *G09G 5/00*   (2006.01)
(52) U.S. Cl.
  USPC .......................................... 345/8
(58) Field of Classification Search
  USPC ........................................ 345/7–9
  See application file for complete search history.

(56) References Cited

U.S. PATENT DOCUMENTS

| | | | |
|---|---|---|---|
| 6,614,422 B1 | 9/2003 | Rafii et al. | |
| 6,710,770 B2 | 3/2004 | Tomasi et al. | |
| 2004/0070611 A1* | 4/2004 | Tanaka et al. | 345/757 |
| 2009/0278766 A1* | 11/2009 | Sako et al. | 345/8 |

FOREIGN PATENT DOCUMENTS

| | | |
|---|---|---|
| JP | A-2001-92589 | 4/2001 |
| JP | B2-3458543 | 10/2003 |
| JP | A-2004-178554 | 6/2004 |
| JP | A-2004-184507 | 7/2004 |
| JP | A-2005-138755 | 6/2005 |
| JP | A-2008-233562 | 10/2008 |
| JP | A-2009-86371 | 4/2009 |
| JP | A-2009-134321 | 6/2009 |

OTHER PUBLICATIONS

Japanese Office Action issued in Japanese Application No. 2009-055575 dated Jul. 31, 2012 (w/ translation).
Japanese Patent Office, Notification of Reason for Refusal mailed Nov. 13, 2012 in Japanese Patent Application No. 2009-229098 w/English-language Translation.

* cited by examiner

*Primary Examiner* — Amare Mengistu
*Assistant Examiner* — Jennifer Zubajlo
(74) *Attorney, Agent, or Firm* — Oliff & Berridge, PLC

(57) ABSTRACT

In a head mount display, an imaging unit detects hands of a user in such a manner by imaging a range which includes at least a display region displayed by a display unit out of a field of view of a user. In displaying a reference image which is used as a reference when a user performs a predetermined operation, the head mount display reduces visibility of the reference image for the user in a region defined between one hand and the other hand of the user.

8 Claims, 18 Drawing Sheets

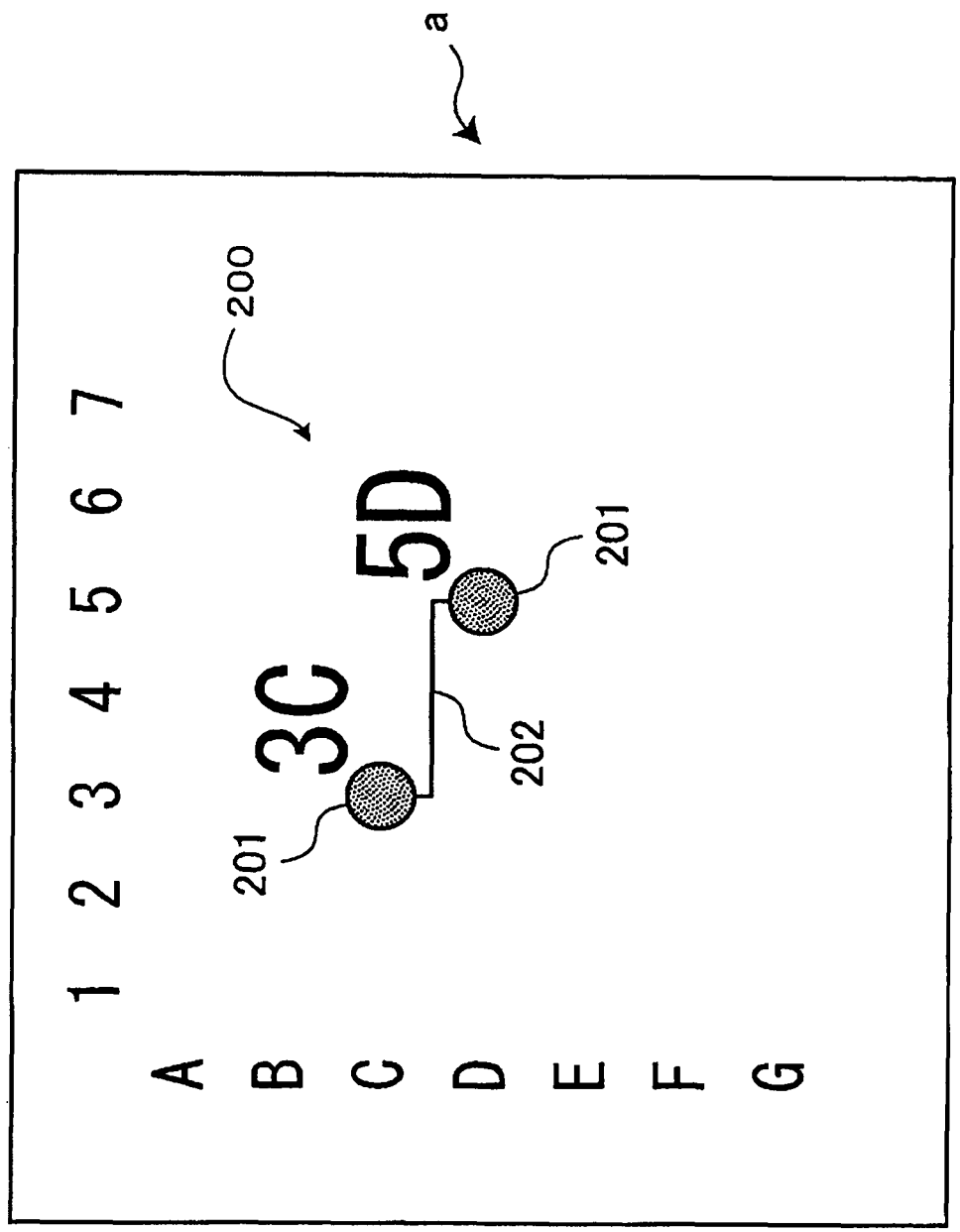

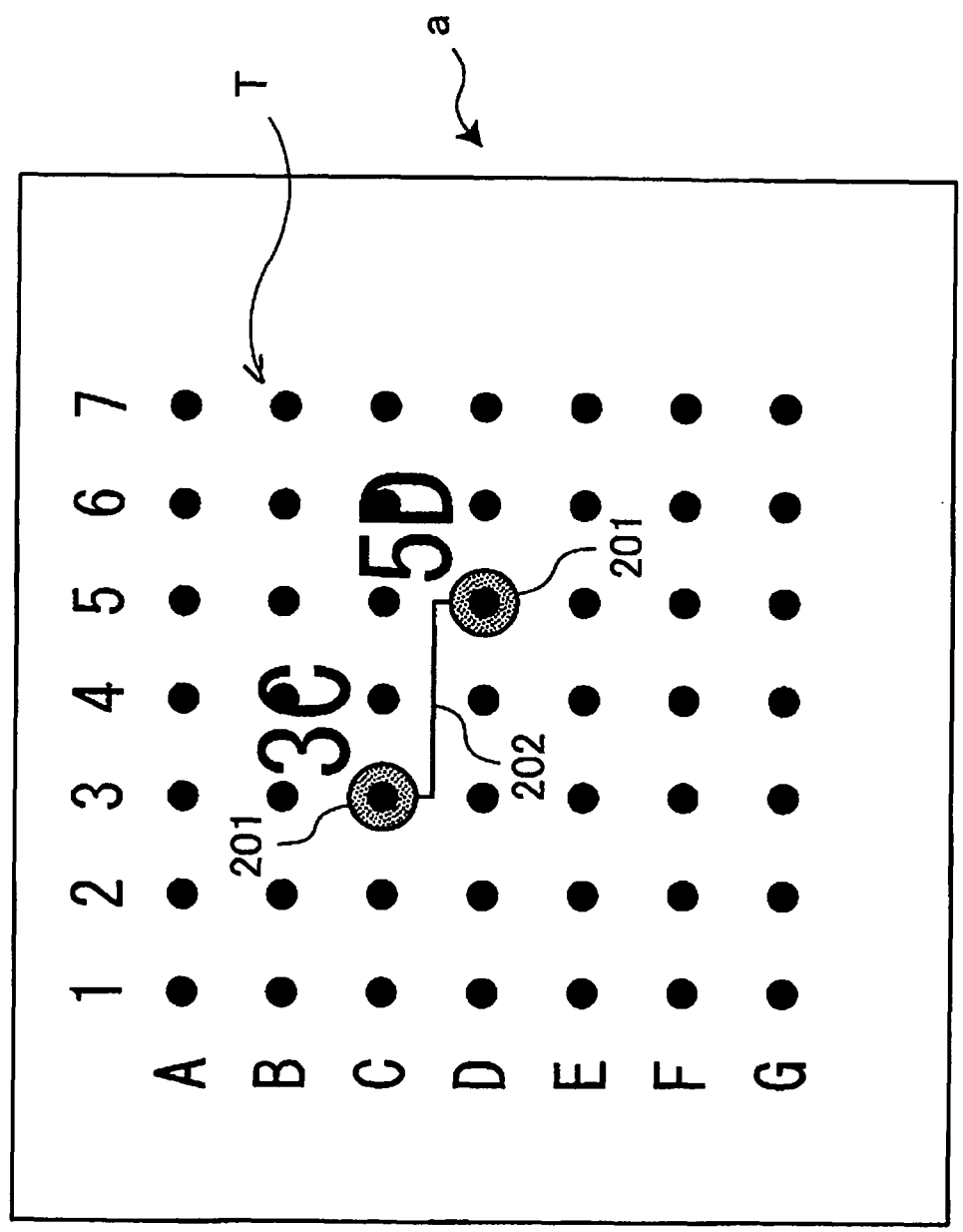

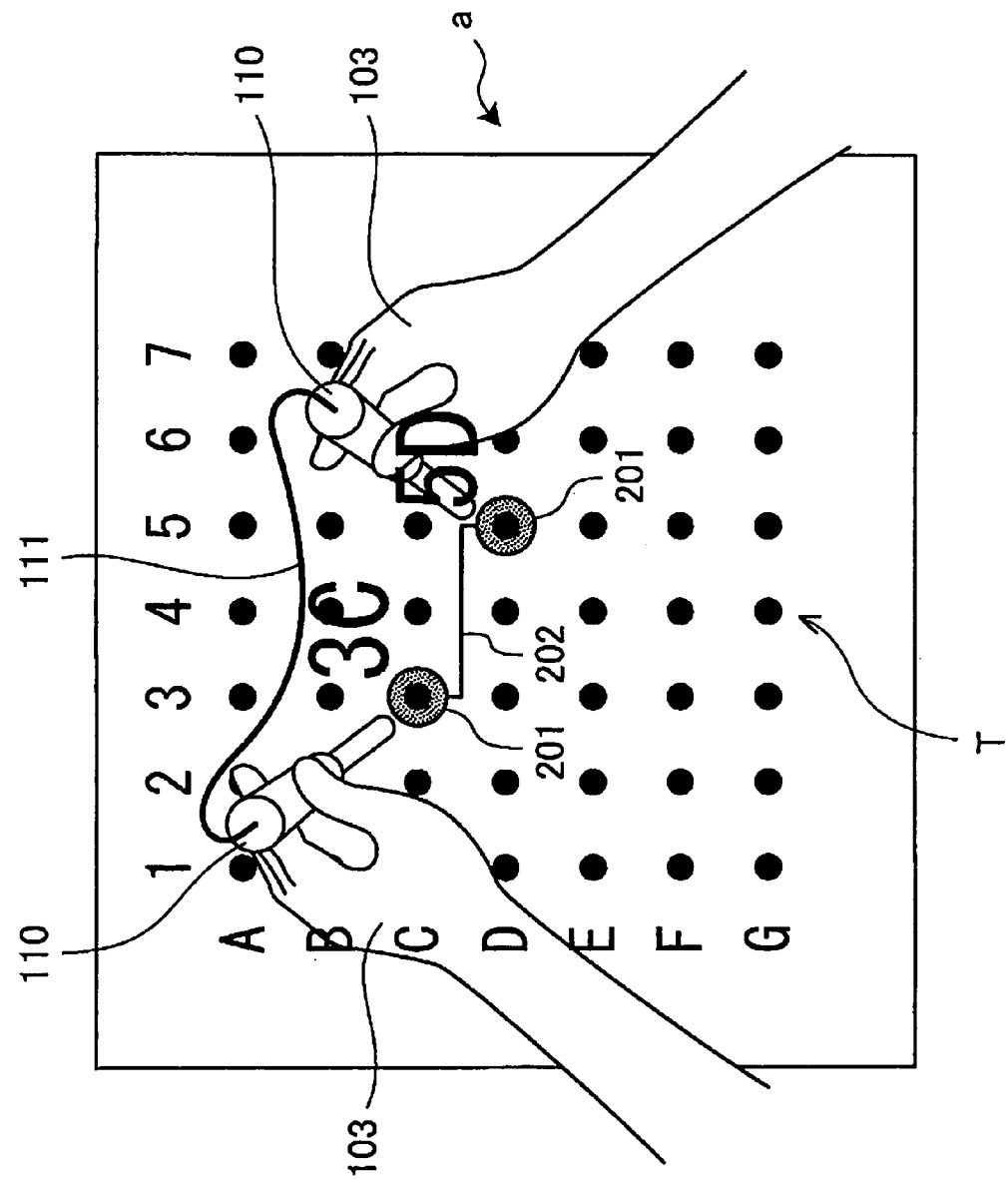

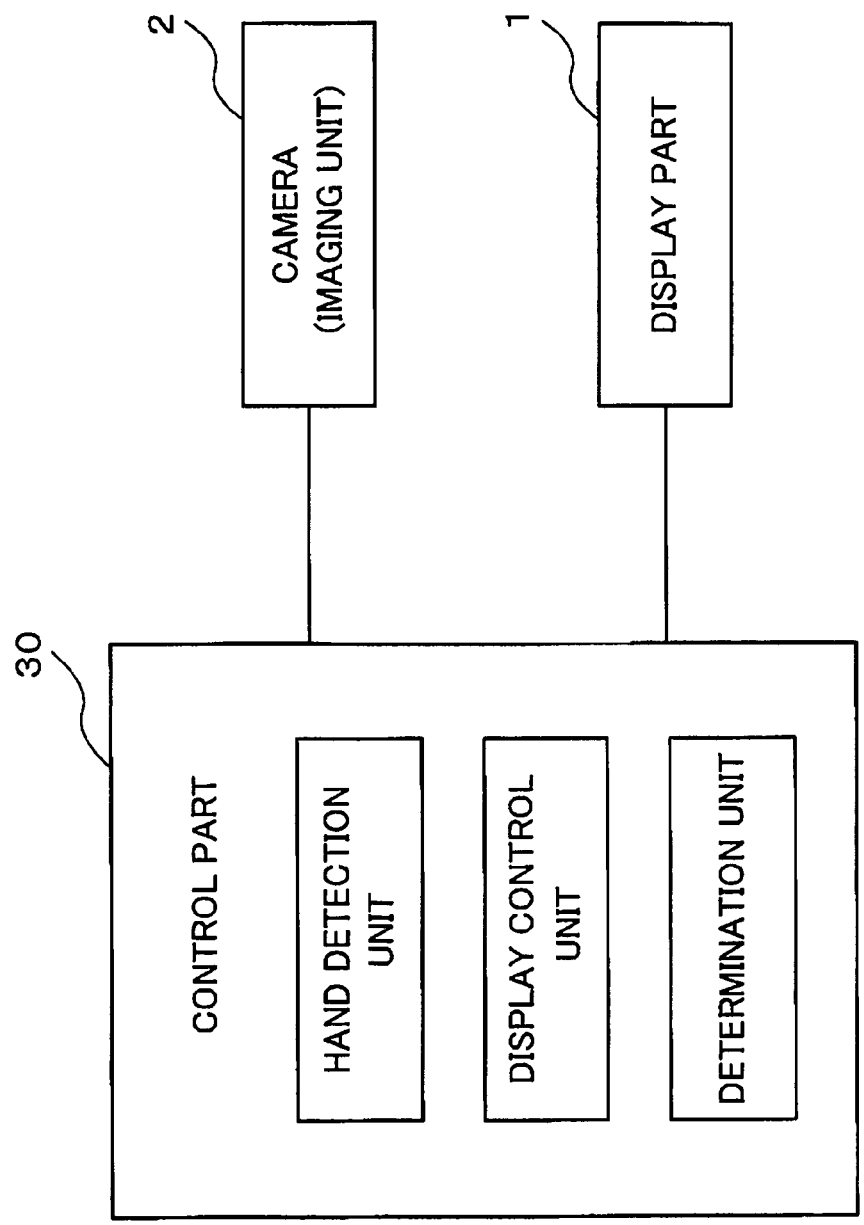

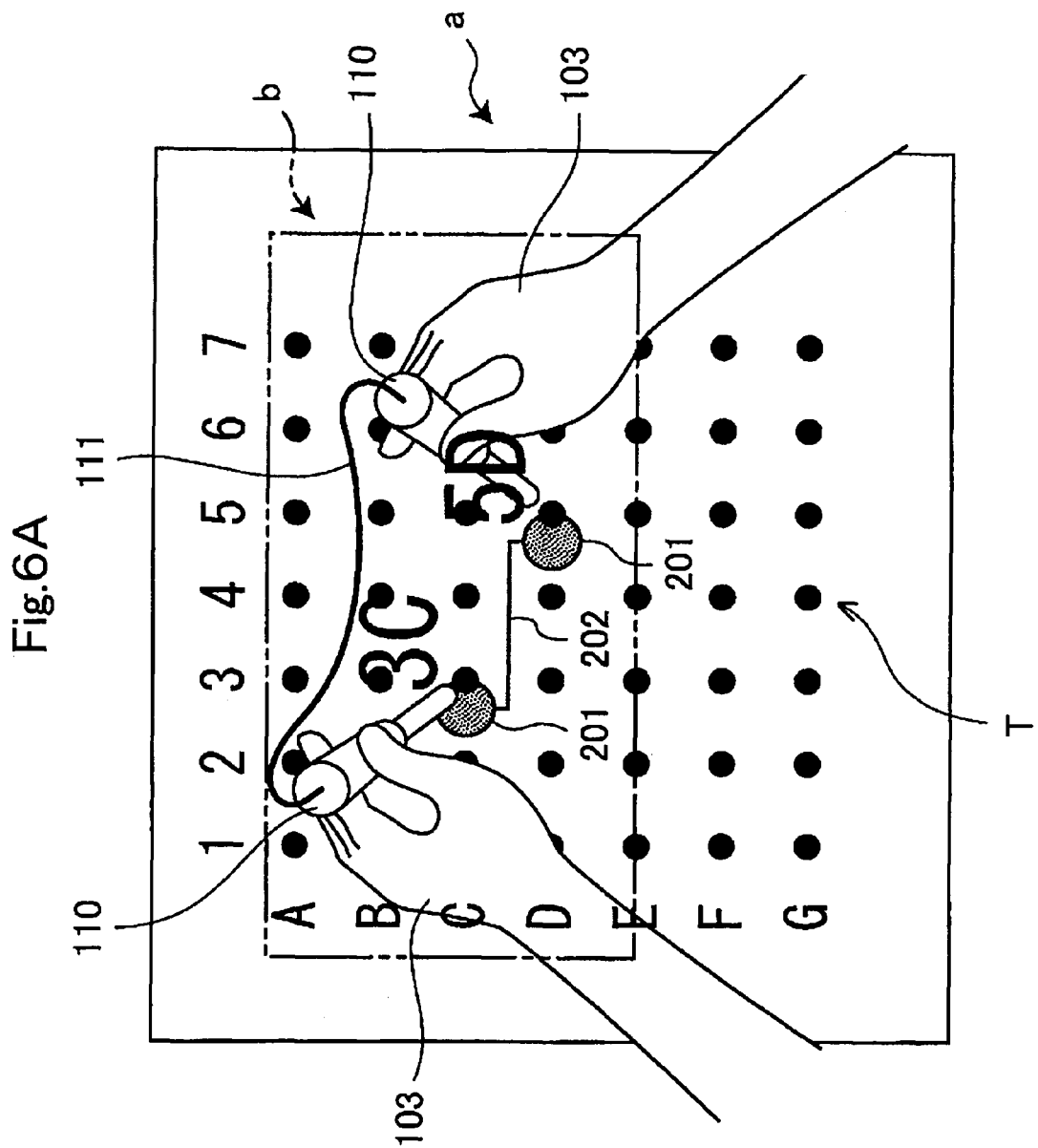

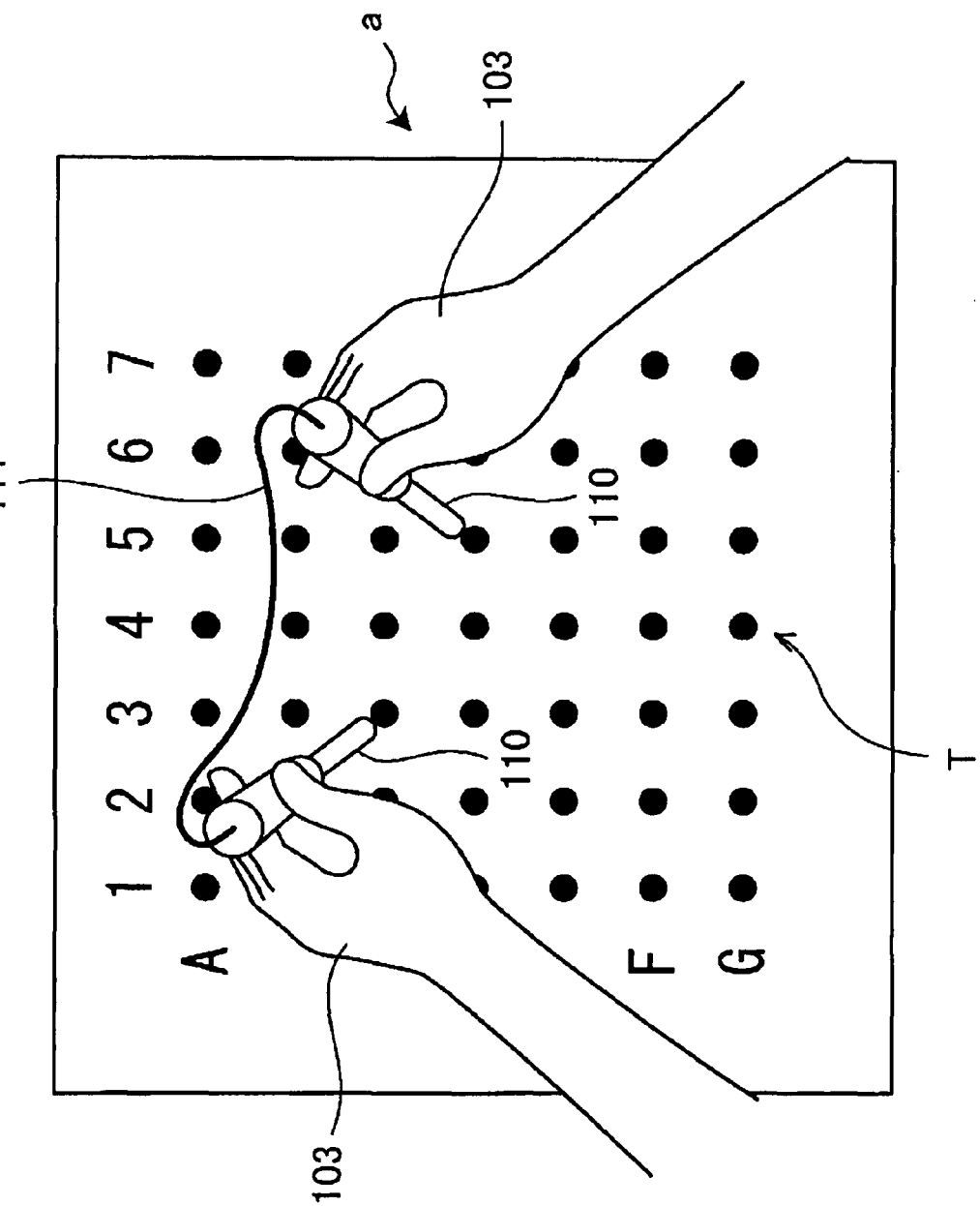

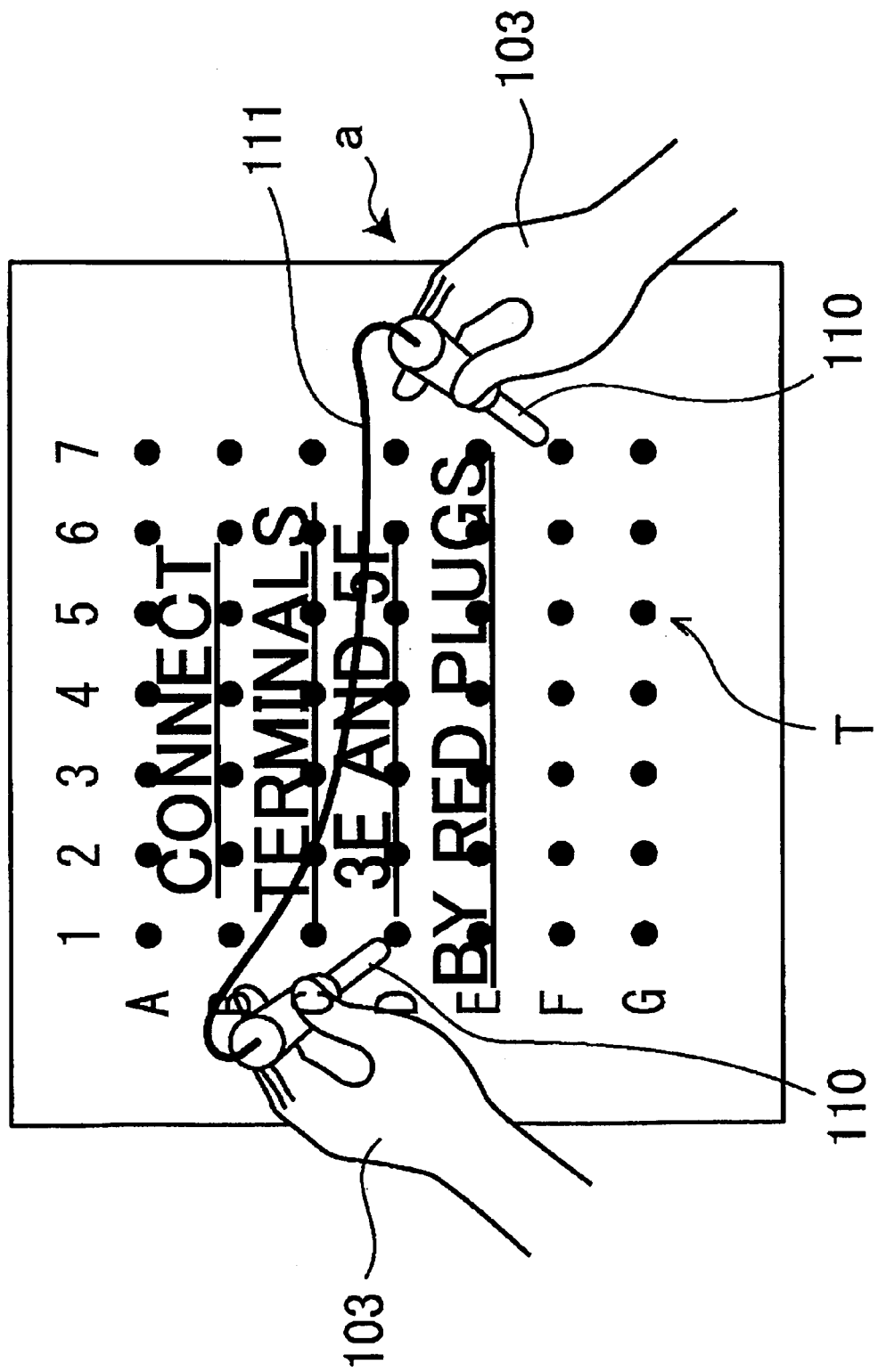

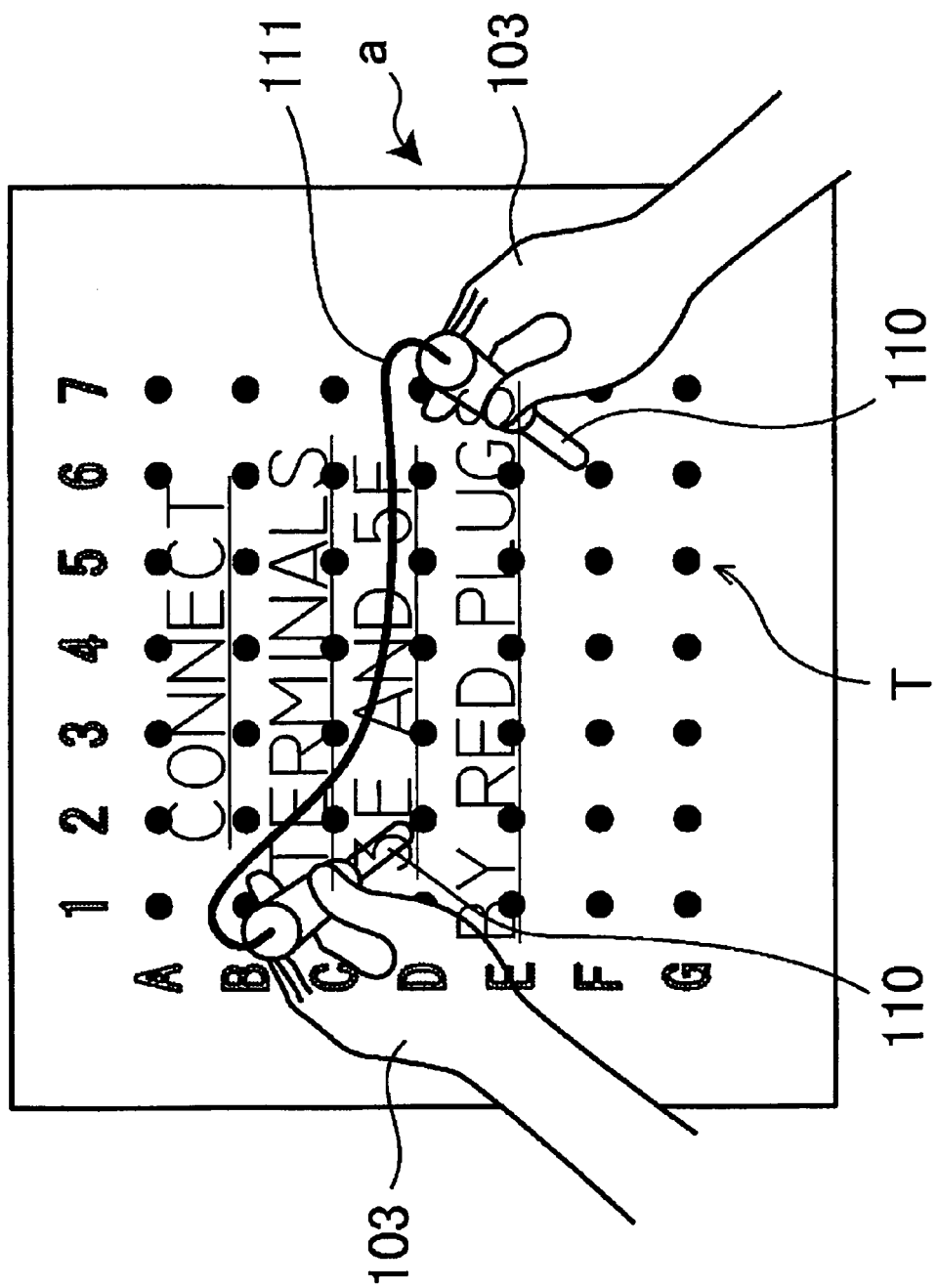

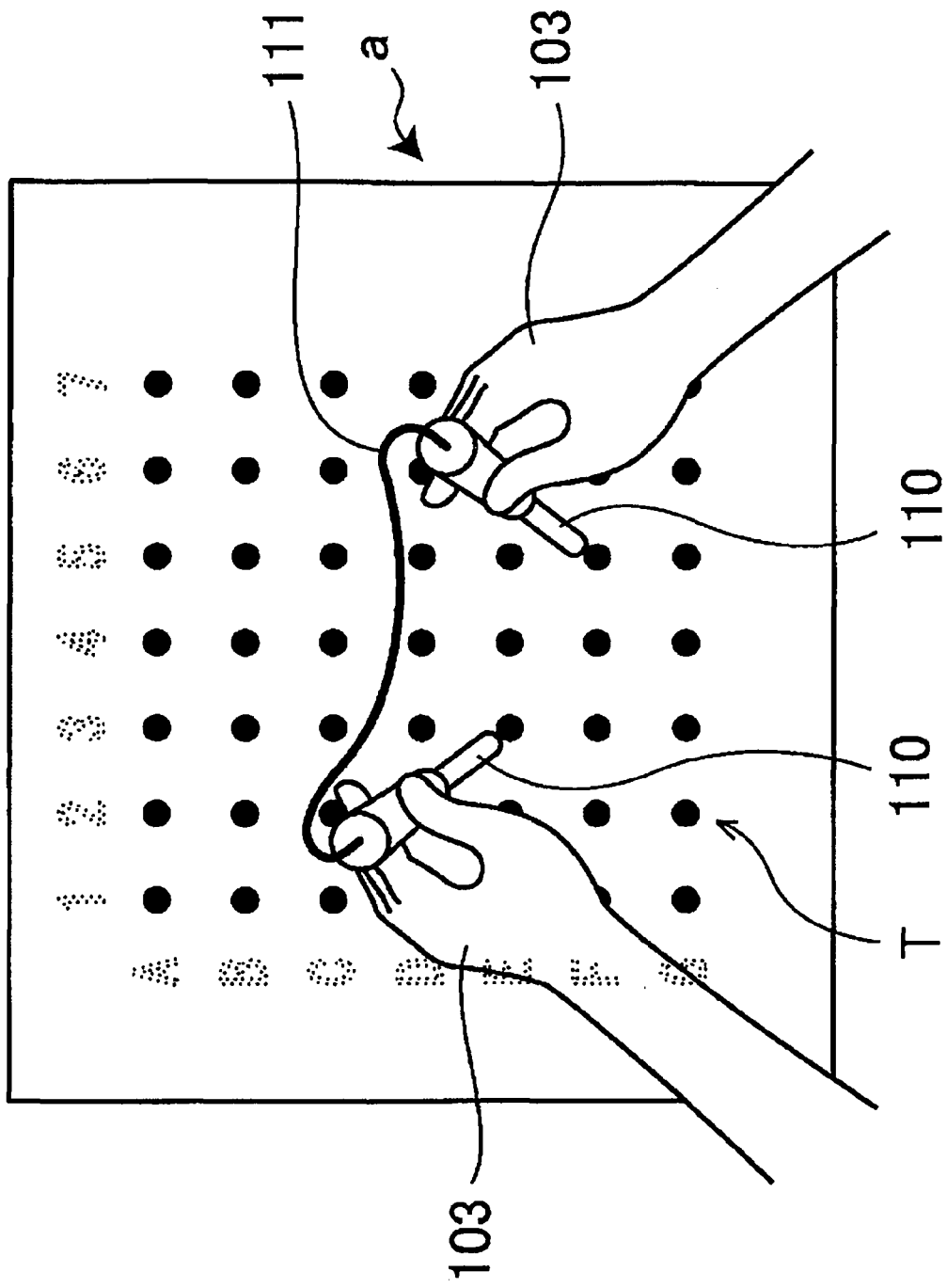

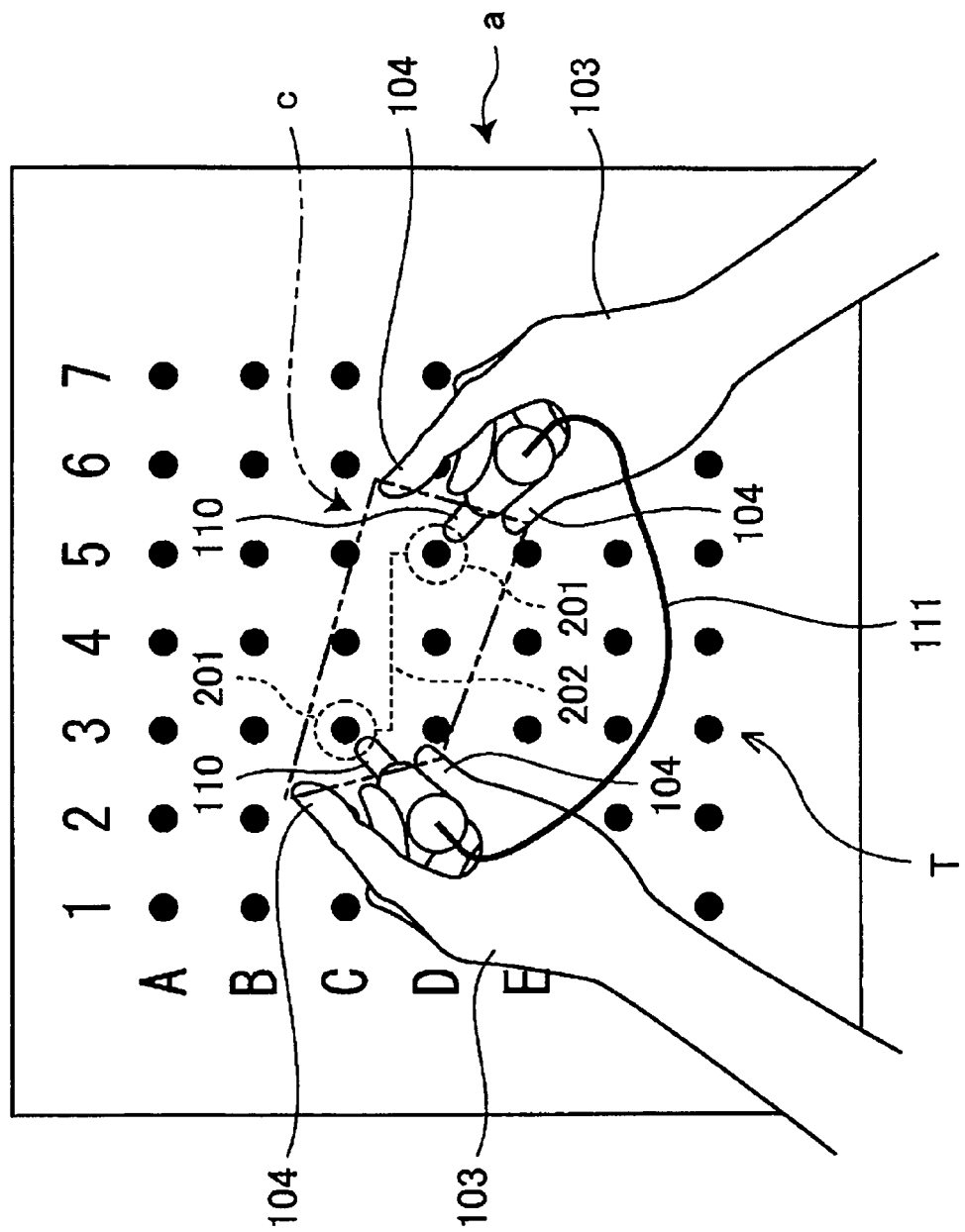

HEAD MOUNT DISPLAY

CROSS-REFERENCE TO RELATED APPLICATIONS

This application is based on and claims the benefit of priority from Japanese Patent Application No. 2009-055575 filed on Mar. 9, 2009, the entire contents of which are incorporated herein by reference.

BACKGROUND

1. Field

The present invention relates to a head mount display.

2. Description of the Related Art

Conventionally, as one example of an image display device, there has been known a head mount display having a display unit which allows an image light corresponding to image information to be incident on an eye of a user together with an ambient light thus displaying an image corresponding to the image information in an overlapping manner with ambient scenery.

As a mode where the head mount display is used, considered is a case where, in a state where a user wears the head mount display on his head, the user is engaged with a predetermined operation while displaying a reference image such as an operation manual on a display unit, for example.

In this case, when a user actually performs an operation using his hands, the reference image displayed by the display unit may disturb such an operation. When it is determined that the reference image will disturb the operation, it is desirable for the user to erase the reference image wholly or partially.

On the other hand, there has been known a virtual image display device as one example of the image display device. This virtual image display device is mountable on a vehicle or the like and can display image information as a virtual image using a reflection unit.

This virtual image display device includes a line of sight specifying unit, a virtual image specifying unit, a display command detection unit, and a display control unit. The line of sight specifying unit specifies a line of sight of a user who operates the virtual image display device. The virtual image specifying unit specifies a virtual image on the user line of sight specified by the line of sight specifying unit or a virtual image in the vicinity of the line of sight out of virtual images displayed by the virtual image display device as a focusing virtual image on which the user focuses his attention. The display command detection unit detects a display control command for controlling a display by the virtual image display device. The display control unit, when the display control command detected by the display command detection unit is a command with respect to the display of the focusing virtual image, controls the display of the focusing virtual image based on the display control command.

Then, the display command detection unit recognizes the movement of hands or fingers of the user, and specifies an instruction content of the display control command based on the recognized movement. Due to such operations, the user delivers his commands to the virtual image display device by moving his hands or fingers or by making gestures.

In such a manner, in the virtual image display device, with respect to the virtual image which is specified as the focusing image, the user can erase the virtual image by the predetermined gesture.

SUMMARY OF THE INVENTION

As described previously, in the head mount display, there has been proposed no technique which can erase the reference image when it is determined that the reference image displayed by the display unit disturbs the operation. To cope with such a situation, it may be possible to adopt a technique which simply erases the reference image which the user specifies wholly or partially with a predetermined gesture.

However, the user uses his hands often during the operation and hence, the erasing of the reference image (virtual image) by the gesture of his hands or fingers may inevitably bring troubles such as the interruption of the operation into the operation. Further, the virtual image display device requires a specific unit which specifies the image so that there exists a possibility that the virtual image display device becomes complicated.

In view of the above, in a head mount display used in an operation which uses his hands or fingers, there has been a demand for a technique which can simply perform a display control of a reference image without disturbing the operation.

The present invention is made under such circumstances, and it is an object of the present invention to provide a head mount display (hereinafter referred to as "HMD") which can perform a display control which enhances visibility of ambient scenery including an operation object by reducing visibility of a region which disturbs an operation out of a reference image displayed by a display unit.

According to one aspect of the present invention, there is provided an HMD which includes a display unit, an imaging unit, a hand detection unit, a display control unit, and a determination unit. The display unit allows an image light corresponding to image information to be incident on an eye of an user together with an ambient light thus displaying an image corresponding to the image information in an overlapping manner with ambient scenery. The imaging unit images a range which includes at least a display region provided by the display unit out of a field of view of the user. The hand detection unit detects hands of the user by analyzing the image imaged by the imaging unit. The display control unit performs a control in which a reference image which is used as a reference when the user performs a predetermined operation is displayed by the display unit. The determination unit determines a region which is defined between one hand and the other hand of the user detected by the hand detection unit. The display control unit reduces visibility of the region which is determined by the determination unit out of the reference image displayed by the display unit for the user.

BRIEF DESCRIPTION OF THE DRAWINGS

FIG. 3A is an explanatory view of a reference image formed in an image display region of the HMD, FIG. 3B is an explanatory view showing a state where the reference image and an actual wiring operation part of the switch-board overlap with each other;

FIG. 4 is an explanatory view of a wiring operation which a user performs while visually recognizing the reference image using the HMD according to this embodiment;

FIG. 5 is a schematic constitutional view of the HMD according to this embodiment;

FIG. 6A and FIG. 6B are explanatory views showing one example of a control for reducing visibility of the reference image;

FIG. 10A to FIG. 10C are explanatory views showing content display control processing of the HMD according to a modification of the embodiment of the present invention;

FIG. 11A and FIG. 11B are explanatory views showing one example of a control for reducing visibility of a reference image.

DETAILED DESCRIPTION

Hereinafter, one example of an HMD according to one embodiment is explained in conjunction with drawings. The explanation is made hereinafter assuming that an HMD is a retinal-scanning-type HMD in which an image light formed based on an image signal is scanned two-dimensionally, the scanned image light is projected onto an eye of a user thus forming an image on a retina. However, the HMD is not limited to the retinal-scanning-type HMD and the present invention is applicable to any HMD which includes a display unit which allows an image light corresponding to image information to be incident on an eye of a user together with an ambient light, and displays an image corresponding to the image information to the eye of the user in an overlapping manner with ambient scenery.

1. Summary of HMD

Figure 1:
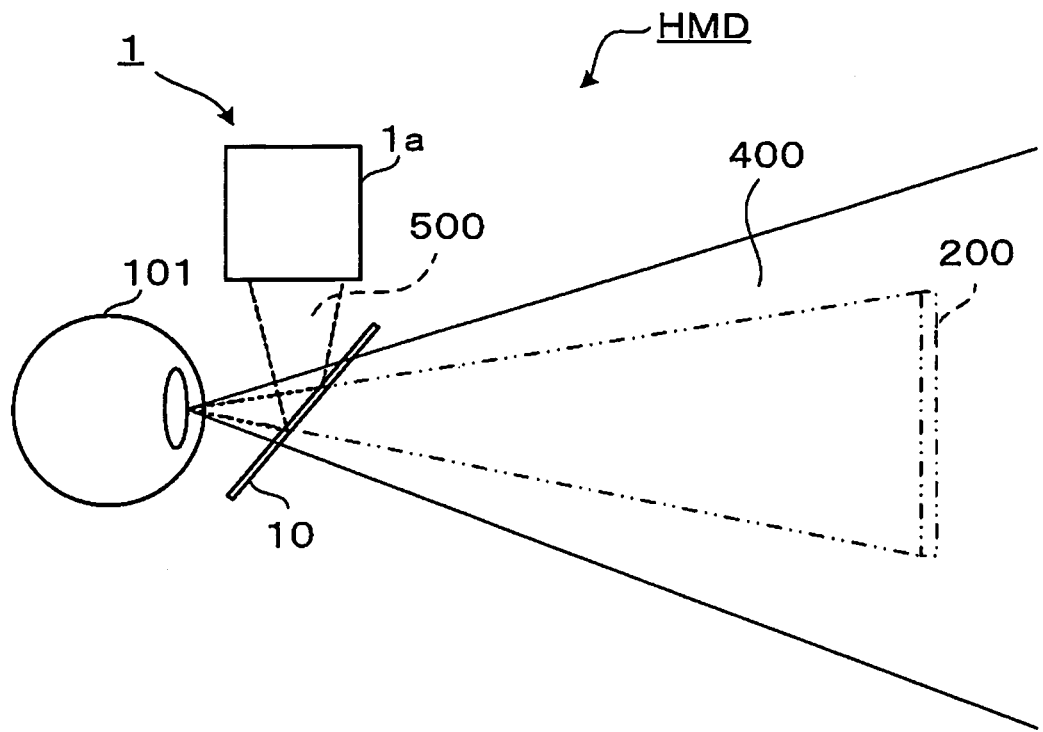
FIG. 1 is an explanatory view showing an advancing path of light in an HMD according to one embodiment of the present invention.

As shown in FIG. 1, the HMD according to this embodiment is configured to display, as a display image which constitutes a content, a reference image 200 such as an operation manual, for example, to an eye 101 of a user 100 such that the user 100 can visually recognize the reference image 200. That is, the HMD is configured to allow the user 100 to perform a predetermined operation while visually recognizing the reference image 200 by wearing the HMD on his head 102. In this embodiment, as such an operation which the user 100 performs using the HMD, the explanation is made with respect to a case where the user 100 performs a wiring operation on a switch-board D using a pair of banana plugs 110, 110 which are connected to each other by a cord 111. However, an operation to which the HMD according to the present invention is applicable is not limited to the wiring operation.

The HMD includes a display part 1 as shown in FIG. 1. The display part 1, with the use of a half mirror 10 incorporated therein, allows a part of an ambient light 400 to pass through the half mirror 10 and to reach at least either one of eyes 101 of the user 100 so that the user 100 can visually recognize the switch-board D shown in FIG. 2, for example. At the same time, the HMD allows an image light 500 which corresponds to the reference image information and is projected from a projection unit 1a to be reflected on the half mirror 10 and to be projected onto the eye 101 of the user 100 so that the user 100 can visually recognize the reference image 200.

Figure 2:
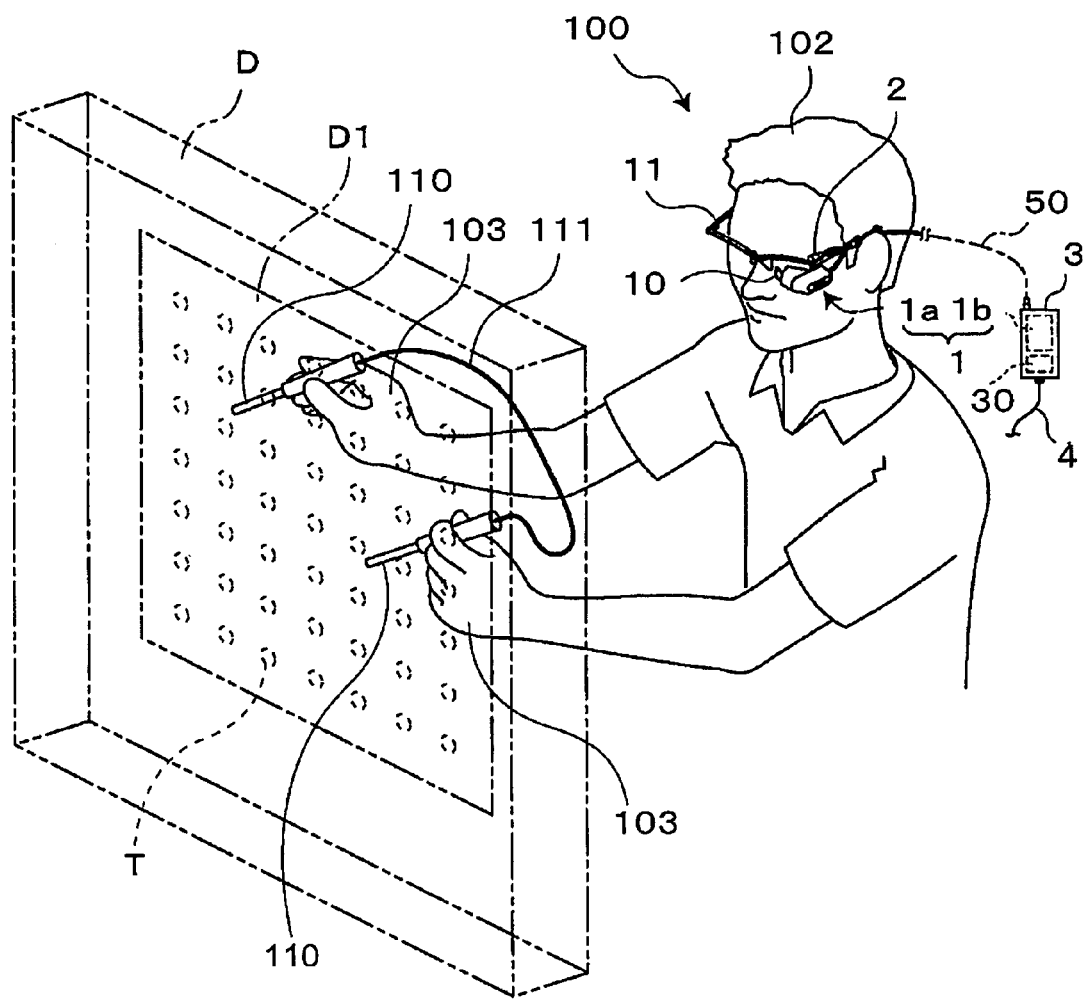
FIG. 2 is an explanatory view showing a use state of the HMD in a wiring operation performed on a switch-board.

The display part 1 includes, as shown in FIG. 2, the projection unit 1a which is mounted on the head 102 of the user 100, the half mirror 10 which is arranged in front of the projection unit 1a, and a light source unit 1b which is connected to the projection unit 1a through an optical fiber cable 50. The projection unit 1a is mounted on a eyeglass-frame-shaped mounting portion 11 which the user 100 wears on his head 102. The light source unit 1b is incorporated into a control unit 3 which is formed as a body separate from the projection unit 1a. Since the mounting portion 11 has an eyeglass frame shape, the user 100 can easily wear the mounting portion 11 on the head 102 like eye glasses.

The reference image 200 is prepared preliminarily to be adapted to a content of a wiring operation performed on the switch-board D. As shown in FIG. 2, on a wiring operation part D1 of the switch-board D, a plurality of terminals T are mounted in a matrix array thus forming a group of terminals T. According to this embodiment, as shown in FIG. 3A and FIG. 3B, the display part 1 of the HMD is configured to display coordinates in the longitudinal and lateral directions (A-G, 1-7) which correspond to the group of terminals T and in a predetermined image display region a. The display part 1 is also configured to display dot marks 201, 202 corresponding to the terminals T to be connected to each other in accordance with the sequence of a wiring operation in the predetermined image display region.

The reference image 200 shown in FIG. 3A indicates the sequence of the wiring operation for connecting the terminal T positioned at the coordinates (3,C) and the terminal T positioned at the coordinates (5,D) by wiring. That is, the reference image 200 contains the coordinates indicative of positions of the terminals T, the dot marks 201, 201 corresponding to the terminals T to be connected, and a line 202 which connects the dot marks 201, 201 to each other.

Further, as shown in FIG. 3B, within a field of view of the user 100, due to the above-mentioned function of the half mirror 10, the reference image 200 is displayed in an overlapping manner with the actual wiring operation part D1 which constitutes an operation object.

Accordingly, as shown in FIG. 4 by overlapping the reference image 200 with the actual wiring operation part D1 using the HMD, the user 100 can simply specify the terminals T to be connected to each other and hence, even a user 100 who is not skilled in the wiring operation can easily perform the predetermined wiring operation using his hands 103, 103.

However, as shown in FIG. 4, when the dot mark 201 overlaps with the terminal T, it is considered difficult for the user 100 to visually recognize the position of the actual terminal T. Further, when a position of the head 102 of the user 100 moves, the position of the reference image 200 and the position of the terminal T on the actual wiring operation part D1 are easily displaced from each other resulting in the erroneous wiring or an erroneous wiring operation.

To overcome such drawbacks, the HMD according to this embodiment includes, as shown in FIG. 5, in addition to the display part 1, a control part 30 which functions as a hand detection unit, a display control unit and a determination unit, and a CCD camera 2. The CCD camera 2 is an imaging unit which images a range including at least a display region where the reference image 200 is displayed by the display part 1 within a field of view of the user 100. The hand detection unit analyzes an image imaged by the CCD camera 2 and detects the hands 103 of the user 100. The display control unit performs a control for displaying the reference image 200. The determination unit determines an operation region b which is formed between one hand 103 and the other hand 103 detected by the hand detection unit (see FIG. 6).

Due to such a constitution, as described in detail later, the display control unit can reduce visibility (for example, the brightness) of the operation region b determined by the determination unit for the user 100 within the reference image 200 displayed by the display part 1 and hence, visibility of the wiring operation part D1 which constitutes an operation object can be enhanced.

The control part 30 according to this embodiment which functions as the hand detection unit, the display control unit and the determination unit is incorporated into the control unit 3. The control part 30 is, as explained in detail later in conjunction with FIG. 8, constituted of a computer having a CPU 40, a program ROM 41, a flash ROM 42, a RAM 43 and the like. The CPU 40 functions as the respective units in accordance with a control program stored in the program ROM 41. A part of the control program stored in the program ROM 41 may be recorded in a recording medium such as a CD-R or a DVD-R. In this case, the control unit 3 may include an predetermined external connection terminal, a recording medium drive not shown in the drawing may be connected to the external connection terminal, and the part of the control program may be read by the flash ROM 42 through the recording medium.

In this manner, the control part 30 functions as the hand detection unit and the determination unit as shown in FIG. 6A. That is, the control part 30 detects the hands 103 of the user 100 as the hand detection unit. Further, the control part 30 also functions as the determination unit. When the control part 30 determines a predetermined region defined between both left and right hands 103, 103 detected by the hand detection unit as the operation region b, the control part 30 reduces visibility of the reference image 200 by reducing the brightness of the reference image 200 which is displayed in an overlapping manner with the operation region b. The control part 30 reduces visibility of the reference image 200 by reducing the brightness of the reference image 200 in this manner and hence, the visibility reduction processing which the HMD requires can be easily performed.

The operation region b defined between one hand 103 and the other hand 103 may be exactly a region which is formed between both hands 103, 103 or may be a region which includes both hands 103, 103 in addition to the region which is formed between both hands 103, 103. In this embodiment, as shown in FIG. 6A, the operation region b is defined as the region which includes both hands 103, 103 in addition to the region which is formed between both hands 103, 103. Accordingly, along with the reduction of the brightness of the reference image 200 in the operation region b, out of the letters A-G taken on an axis of ordinates which form a part of the reference image 200, letters B,C,D,E which overlap with the left hand 103 disappear from the display region. Further, in FIG. 6A, the dot marks 201, 202 corresponding to the terminals T to be connected to each other by banana plugs 110 which are displaced from the correct positions, the line 202 which connects both of the dot marks 201, 201 and the coordinates which indicate the positions of these terminals T are displayed. However, in FIG. 6B, these dot marks 201, 201, line 202 and coordinates disappear from the display region thus providing the clear-cut display to the user 100. Accordingly, the visibility of the wiring operation part D1 is improved and hence, the reference image 200 no more disturbs the wiring operation so that the user 100 can easily perform the wiring operation.

In the example shown in FIG. 6B, the control part 30 which functions as the display control unit sets the brightness of a portion of the reference image 200 which is displayed in an overlapping manner with the operation region b to zero out of the whole reference image 200 and hence, the portion of the reference image 200 where the brightness is set to zero is eliminated from a field of view of the user 100. In this manner, it is possible to completely prevent the portion of the reference image 200 which disturbs the wiring operation in the operation region b from being visually recognized by the user 100. However, as will be described in detail later, it is not always necessary to set the brightness of the reference image 200 which overlaps with the operation region b to zero to enhance visibility of the wiring operation part D1. That is, it is sufficient that visibility of the wiring operation part D1 in the operation region b is enhanced by changing the degree of reduction of visibility of the reference image 200 for the user 100 in the operation region b.

As a method of detecting the hand 103 of the user 100, a proper well-known technique may be suitably adopted. In this embodiment, the hand 103 of the user 100 is detected based on color (skin color) of the hand 103 in an imaged image imaged by the CCD camera 2 capable of imaging a range which includes at least the display region provided by the display part 1 out of a field of view of the user 100, and an area which the color occupies with respect to the total display region.

That is, the control part 30 calculates color temperature based on R,G,B values of respective pixels contained in the imaged image obtained by the CCD camera 2, determines whether or not an area of the region which is formed of a mass of pixels of color temperature indicative of skin color is not less than a predetermined value, and detects the region as the hand 103 of the user 100 when the area of the region is not less than a predetermined value.

Here, it is needless to say that when the user 100 performs an operation by wearing a glove on his hand 103, the control part 30 detects color of the glove.

2. Specific Constitution of HMD Including Electrical Constitution and Optical Constitution As described previously in conjunction with this embodiment, the projection unit 1a of the HMD is mounted on the eyeglass-frame-shaped mounting portion 11. As shown in FIG. 2, the mounting portion 11 is formed in an approximate L shape as viewed in a plan view and covers a left eye portion and a left temple portion of the user 100 when the user 100 wears the mounting portion 11 on his head 102. The CCD camera 2 is arranged at a position above the projection unit 1a.

Further, as shown in FIG. 1 and FIG. 2, the half mirror 10 is mounted on a distal end side of the projection unit 1a such that the half mirror 10 is positioned in front of the left eye 101. That is, in the HMD of this embodiment, as shown in FIG. 1, the ambient light 400 passes through the half mirror 10 and is incident on the left eye 101 of the user 100, while the image light 500 is reflected on the half mirror 10 and is incident on the eye 101 of the user 100. As a matter of course, the ambient light 400 is also incident on the right eye 101. Accordingly, the user 100 can also visually recognize an external field while visually recognizing the reference image 200 even in a state where the user 100 closes his right eye 101, not to mention a state where the user 100 opens both eyes 101, 101.

The user 100 can carry the control unit 3 in his clothes pocket. The light source unit 1b arranged in the control unit 3 is connectable with external equipment such as a PC (personal computer) 300 (see FIG. 8) through an external connection cable 4 (see FIG. 2) so as to allow the light source unit 1b to acquire image information. The light source unit 1b is connected to the projection unit 1a through an optical fiber cable 50 or the like.

Further, the light source unit 1b includes an image signal supply circuit 6 described later. The light source unit 1b forms the image light 500 by performing intensity modulation of image information corresponding to image data transmitted from the PC 300 per pixel, and transmits the image light 500 to the projection unit 1a through the optical fiber cable 50.

The projection unit 1a scans the image light 500 transmitted from the light source unit 1b and projects the image light 500 to the eye 101 of the user 100 so as to allow the user 100 to visually recognize the reference image 200.

Figure 7:
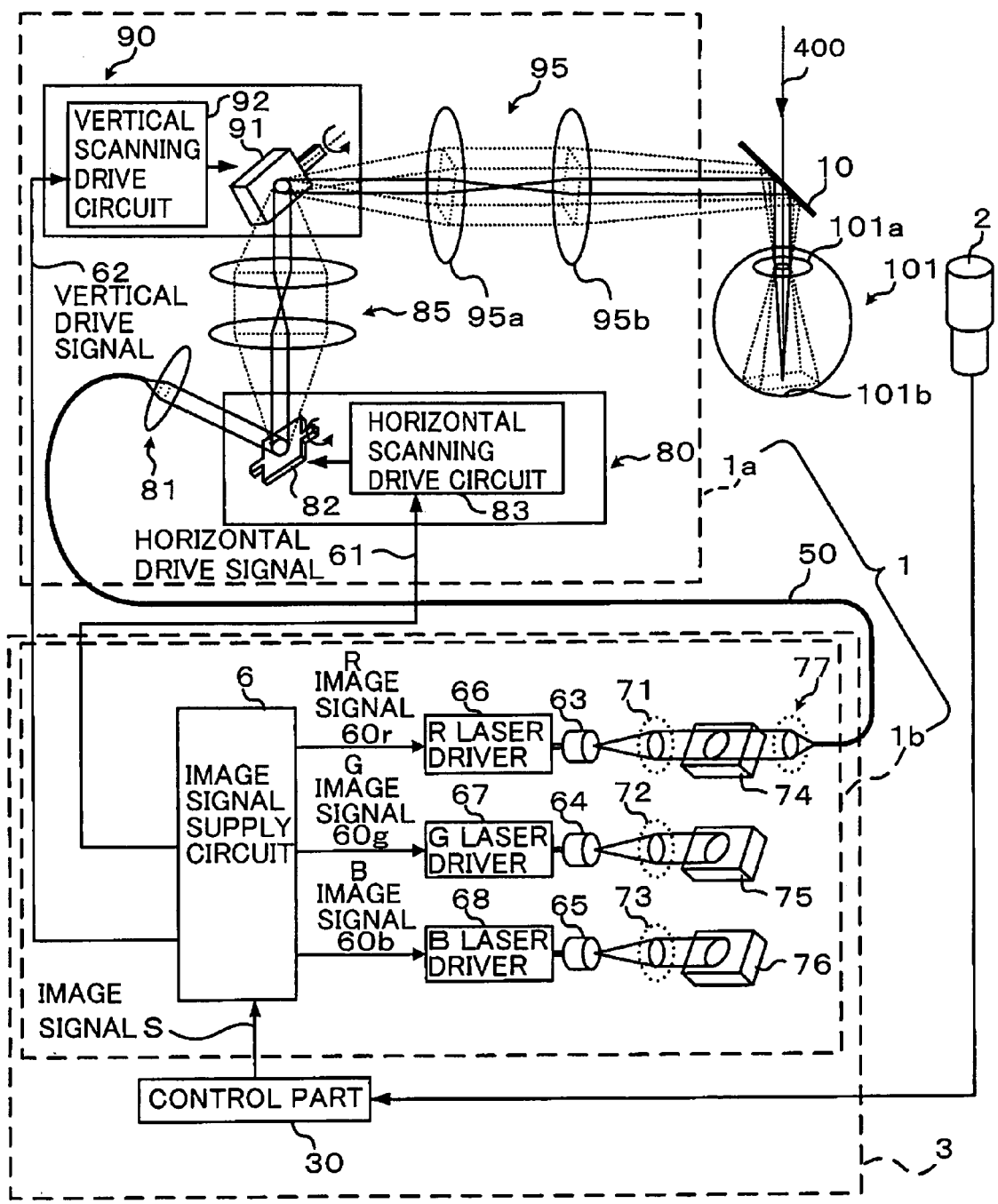
FIG. 7 is a block diagram showing the electrical constitution and the optical constitution of the HMD.

As shown in FIG. 7, the HMD includes the display part 1 and the CCD camera 2. As described previously, the display part 1 which forms the display unit is constituted of the projection unit 1a mounted on the mounting portion 11 and the light source unit 1b arranged in the control unit 3.

The control part 30 which performs a systematic control of an operation of the whole HMD body is also arranged in the control unit 3. The light source unit 1b reads image information in response to an image signal S supplied from the control part 30 per pixel, and generates and radiates an optical flux whose intensity is modulated for each color of R (red), G (green), B (blue) based on read image information per pixel.

Instead of mounting the light source unit 1b in the control unit 3, the light source unit 1b may be mounted in the projection unit 1a. Further, in this embodiment, the explanation has been made with respect to the example where the display part 1 is the retinal scanning display part in which laser beams which are scanned two-dimensionally are incident on the eye 101 of the user 100 and are projected onto the retina 101b. However, a constitution of the display part 1 is not limited to the retinal scanning display part. For example, a liquid-crystal-type display part may be used as the display part 1. As the liquid-crystal-type display part, for example, a transmissive display part and a reflective display part are named. The transmissive display part is configured such that light emitted from a light source is radiated to a transmissive liquid crystal panel, and light which passes through the liquid crystal panel is incident on an eye of a user as an image light. The reflective display part is configured such that light emitted from a light source is radiated to a reflective liquid crystal panel, and light which is reflected on the liquid crystal panel is incident on an eye of a user as an image light.

(Light Source Unit 1b)

The light source unit 1b includes an image signal supply circuit 6 for generating signals or the like which constitute elements for composing an image. When image data supplied from the PC 300 is inputted to the control part 30, the control part 30 generates an image signal S based on the image data and transmits the image signal S to the image signal supply circuit 6. The image signal supply circuit 6 generates respective signals which constitute elements for forming a reference image 200 per pixel based on the image signal S. That is, the image signal supply circuit 6 generates and outputs an R (red) image signal 60r, a G (green) image signal 60g, and a B (blue) image signal 60b. Further, the image signal supply circuit 6 outputs a horizontal drive signal 61 which is used by a horizontal scanning part 80, and a vertical drive signal 62 which is used by a vertical scanning part 90.

Further, the light source unit 1b includes an R laser driver 66, a G laser driver 67 and a B laser driver 68. The R laser driver 66, the G laser driver 67 and the B laser driver 68 respectively drive an R laser 63, a G laser 64 and a B laser 65 such that these lasers 63, 64 and 65 radiate laser beams whose intensities are respectively modulated based on the R image signal 60r, the G image signal 60g and the B image signal 60b which are outputted from the image signal supply circuit 6 for every pixel unit. Each laser 63, 64, 65 may be constituted of a semiconductor laser or a solid-state laser having a harmonic generator, for example. Here, when the semiconductor laser is used for forming each laser 63, 64, 65, the intensity of the laser beam may be modulated by directly modulating a drive current, while when the solid-state laser is used for forming each laser 63, 64, 65, it is necessary to modulate the intensity of the laser beam by providing an external modulator to each laser.

Further, the light source unit 1b includes collimation optical systems 71, 72, 73, dichroic mirrors 74, 75, 76, and a coupling optical system 77. The collimation optical systems 71, 72, 73 are provided for collimating the laser beams radiated from the respective lasers 63, 64, 65. The dichroic mirrors 74, 75, 76 synthesize the laser beams which are collimated by the collimation optical systems 71, 72, 73. The coupling optical system 77 guides the synthesized laser beams to the optical fiber cable 50.

Accordingly, the laser beams radiated from the respective lasers 63, 64, 65, after being collimated by the collimation optical systems 71, 72, 73 respectively, are incident on the dichroic mirrors 74, 75, 76. Thereafter, the respective laser beams are selectively reflected on or are allowed to pass through these dichroic mirrors 74, 75, 76 corresponding to wavelengths thereof. The laser beams of three primary colors which are respectively incident on these three dichroic mirrors 74, 75, 76 are reflected on or are allowed to pass through the dichroic mirrors 74, 75, 76 selectively by wavelength, arrive at the coupling optical system 77, are condensed by the coupling optical system 77, and are outputted to the optical fiber cable 50.

(Projection Unit 1a)

The projection unit 1a which is positioned between the light source unit 1b and an eye 101 of the user 100 includes a collimation optical system 81, the horizontal scanning part 80, the vertical scanning part 90, a first relay optical system 85, and a second relay optical system 95. The collimation optical system 81 collimates the laser beams which are generated by the light source unit 1b and are radiated through the optical fiber cable 50. The horizontal scanning part 80 scans the laser beams collimated by the collimation optical system 81 in the horizontal direction in a reciprocating manner for an image display. The vertical scanning part 90 scans the laser beams scanned in the horizontal direction by the horizontal scanning part 80 in the vertical direction. The first relay optical system 85 is arranged between the horizontal scanning part 80 and the vertical scanning part 90. The second relay optical system 95 radiates the laser beams which are scanned in the horizontal direction by the horizontal scanning part 80 and are scanned in the vertical direction by the vertical scanning part 90 to a pupil 101a.

The horizontal scanning part 80 and the vertical scanning part 90 are provided for bringing the laser beams incident from the optical fiber cable 50 into a state where the laser beams can be projected onto the retina 101b of the user 100 as an image, and constitute the optical system which scans the laser beams in the horizontal direction and in the vertical direction. The horizontal scanning part 80 includes a deflection element 82 and a horizontal scanning drive circuit 83. The deflection element 82 is a resonance-type deflection element having a deflection surface for scanning the laser beams in the horizontal direction. The horizontal scanning drive circuit 83 generates a drive signal for resonating the deflection element 82 so as to oscillate the deflection surface of the deflection element 82 based on the horizontal drive signal 61.

On the other hand, the vertical scanning part 90 includes a deflection element 91 and a vertical scanning control circuit 92. The deflection element 91 is a non-resonance-type deflection element having a deflection surface for scanning the laser beams in the vertical direction. Based on the vertical drive signal 62, the vertical scanning control circuit 92 generates a drive signal for oscillating the deflection surface of the deflection element 91 in a non-resonance state. The vertical scanning part 90 vertically scans the laser beams for forming an image in the vertical direction from a first horizontal scanning line to a final horizontal scanning line for every 1 frame of an image to be displayed. Here, the term "horizontal scanning line" implies 1 scanning in the horizontal direction performed by the horizontal scanning part 80.

Here, the deflection elements 82, 91 are formed using a Galvano mirror. However, provided that the deflection surface (reflection surface) of the deflection element 82, 91 is swingable or rotatable so as to enable scanning of the laser beams, any driving method may be used for driving the deflection elements 82, 91 including piezoelectric driving, electromagnetic driving and electrostatic driving. Further, in this embodiment, the horizontal scanning part 80 is formed using the resonance-type deflection element, and the vertical scanning part 90 is formed using the non-resonance-type deflection element. However, the horizontal scanning part 80 and the vertical scanning part 90 are not limited to the above-mentioned elements. For example, the vertical scanning system may adopt the resonance-type deflection element, or both the horizontal scanning part 80 and the vertical scanning part 90 may adopt the non-resonance-type deflection element.

The first relay optical system 85 which relays the laser beams between the horizontal scanning part 80 and the vertical scanning part 90 converges the laser beams which are scanned in the horizontal direction by the deflection surface of the deflection element 82 on the deflection surface of the deflection element 91. Then, the laser beams are scanned in the vertical direction by the deflection surface of the deflection element 91. The laser beams which are scanned in the vertical direction are reflected on the half mirror 10 arranged in front of the eye 101 through the second relay optical system 95 where two lenses 95a, 95b having a positive refractive power are arranged in series. The laser beams reflected on the half mirror 10 is incident on a pupil 101a of the user 100, and the reference image 200 corresponding to the image signal S is projected onto the retina 101b. Accordingly, the user 100 recognizes the laser beams which constitute the image light 500 incident on the pupil 101a in this manner as the reference image 200 (see FIG. 3A and FIG. 3B).

In the second relay optical system 95, with the use of a lens 95a, the respective laser beams have center lines thereof arranged approximately parallel to each other and are converted into converged laser beams. Then, the respective converged laser beams have center lines thereof arranged approximately parallel to each other by the lens 95b, and the center lines of these laser beams are converted into converged laser beams on a pupil 101a of the user 100.

(Control Part 30)

The control part 30 executes predetermined processing described later based on the control program stored therein thus functioning as the hand detection unit, the display control unit, the determination unit and the like described above.

Figure 8:
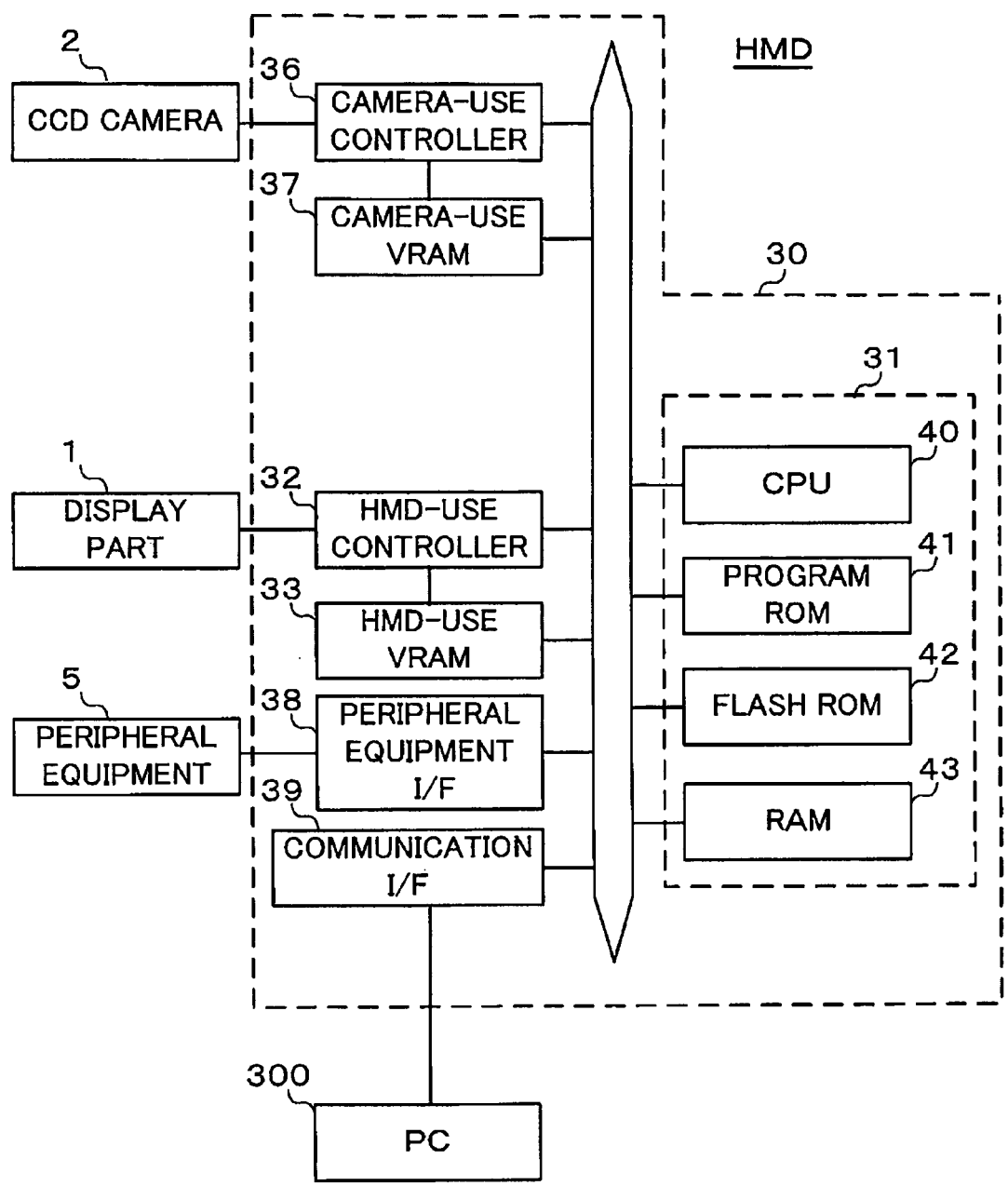
FIG. 8 is a block diagram showing the constitution of a control part.

As shown in FIG. 8, the control part 30 includes respective controllers 31, 32, 36, respective VRAM (Video Random Access Memories) 33, 37, a peripheral equipment interface (indicated by "I/F" in the drawing, and referred to as "I/F" hereinafter) 38, and a communication I/F 39.

The main controller 31 includes a CPU (Central Processing Unit) 40, a program ROM (Read Only Memory) 41, a flash ROM (flash memory) 42 which is a nonvolatile memory, and a RAM (Random Access Memory) 43. These components are connected to a data communication bus respectively, and the transmission and reception of various kinds of information are performed through the data communication bus.

The CPU 40 is an arithmetic processing unit which executes a control program stored in the program ROM 41 and operates, as the main controller 31, respective parts which constitute the HMD such that these parts perform various functions which the HMD possesses. Further, the flash ROM 42 stores image data outputted from a CCD camera 2 or the like, set values of the brightness of the reference image 200 and the like.

The HMD-use controller 32 controls a display part 1 in response to a request from the main controller 31, and supplies the image signal S based on image data stored in the HMD-use VRAM 33 to the display part 1 in response to a signal from the main controller 31. When the image signal S is inputted to the display part 1 from the HMD-use controller 32, the display part 1 generates and scans laser beams of respective colors whose intensities are modulated based on the image signal S, and radiates the scanned laser beams to the eye 101 of the user 100 thus projecting an image corresponding to the image signal S on the retina 101b of the user 100. That is, the main controller 31 performs an image display control in the above-mentioned manner.

A camera-use controller 36 controls the CCD camera 2 which constitutes an imaging unit. The camera-use VRAM 37 temporarily stores image data outputted from the CCD camera 2. The main controller 31 controls the CCD camera 2 through the camera-use controller 36 for recognizing a position of a hand of the user 100. The main controller 31 allows the CCD camera 2 to image at least a range which includes a display region of an image formed by the display part 1 out of a field of view of the user 100, and acquires image data outputted from the CCD camera 2 via the camera-use VRAM 37. Due to such an operation, the main control part 31 can acquire the image which is imaged by the CCD camera 2 and, as described previously, recognizes the hand of the user 100 by detecting a skin-color region and an area of the skin-color region due to an analysis of the image. Here, the main controller 31 may additionally incorporate an image processing part therein in a form of hardware for processing the image imaged by the CCD camera 2. In this case, the main controller 31 can execute image processing at a high speed.

The peripheral equipment I/F 38 is an interface provided for connecting the peripheral equipment 5 such as a power source switch, a content display switch and lamps (not shown in the drawing) to the main controller 31. For example, by connecting the power source switch, the content display switch or the lamps to the peripheral equipment I/F 38, the main controller 31 receives operation information from the above-mentioned switches from the peripheral equipment I/F 38, and supplies lighting information on the lamps to the lamps through the peripheral equipment I/F 38.

The communication I/F 39 is provided for a control which allows communication between the main controller 31 and the PC 300. The main controller 31 requests the PC 300 to supply image data to the main controller 31 through the communication I/F 39, and supplies the image signal S based on the image data supplied to the main controller 31 from the PC 300 through the communication I/F 39 to the display part 1 using the HMD-use controller 32.

Here, although the CCD camera 2 is used as the imaging unit in the above-mentioned embodiment, the imaging unit is not limited to the CCD camera 2, and a CMOS camera or the like may be also used as the imaging unit.

Figure 9:
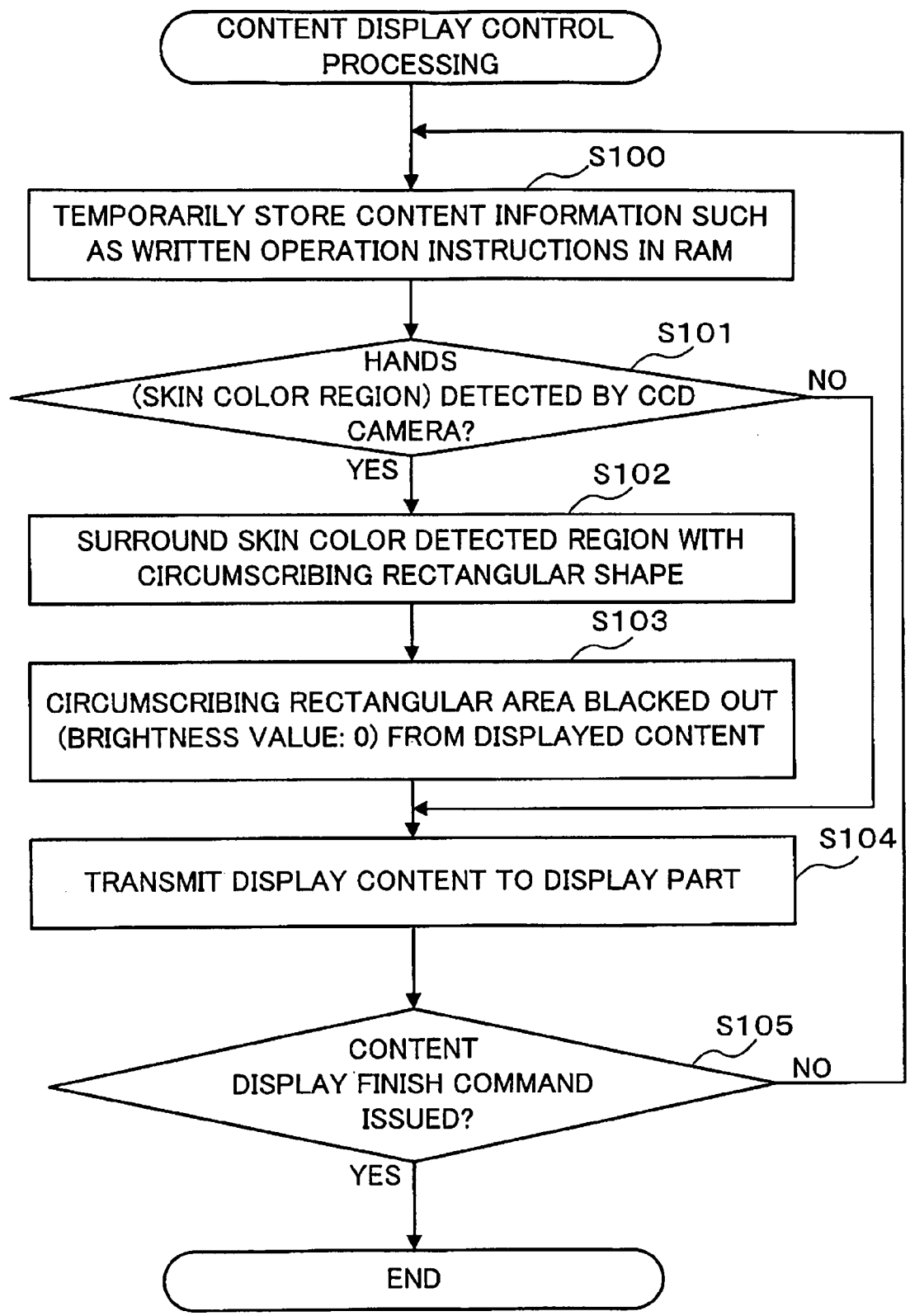
FIG. 9 is a flowchart showing a content display control processing of the HMD according to this embodiment.

Next, one example of processing executed by the control part 30 is explained in conjunction with FIG. 9 and FIG. 6. Assume here that a power source switch (not shown in the drawing) of the HMD is already turned on, all initial setting processing or the like after the power source switch is turned on is completed, and a content display switch (not shown in the drawing) is turned on so that a content display command is already issued.

When the content display command is issued, as shown in FIG. 9, the CPU 40 of the main controller 31 temporarily stores content such as written operation instructions shown in FIG. 3A and FIG. 3B, for example, in the HMD-use VRAM 33 (step S100).

Next, the CPU 40 determines whether or not the CCD camera 2 detects left and right hands 103, 103 of the user 100 (step S101).

That is, as described previously, the CPU 40 acquires image data imaged by the CCD camera 2 through the camera-use VRAM 37. The CPU 40 determines that the hand 103 is present when an area of a region which is constituted of a mass of pixels having color temperature indicative of skin color within an imaging range is not less than a predetermined value based on the image data. When two such regions are detected, the CPU 40 determines that both hands are present in the imaging range.

When the number of regions each of which is constituted of a mass of pixels having color temperature indicative of skin color and has an area not less than a predetermined value is 1, the CPU 40 determines that only one hand is present within the imaging range. When only one hand is present within the imaging range, the characterizing processing of this embodiment, that is, the display control which reduces visibility of the reference image 200 showing the content for the user 100 thus enhancing visibility of the operation object is not executed.

When the CPU 40 determines that either the left hand 103 or the right hand 103 is not detected (step S101: No), the CPU 40 advances the processing to step S104. On the other hand, when the CPU 40 determines that both the left hand 103 and the right hand 103 are detected (step S101: Yes), the CPU 40 surrounds both hands 103, 103 by a rectangular shape (see a double-dashed chained line shown in FIG. 6A) which virtually circumscribes two regions detected as skin color (skin-color detection regions) thus specifying the position of the operation region b surrounded by the circumscribing rectangular shape in the image display region a (step S102).

Next, the CPU 40 executes a control where a portion of the reference image 200 within the operation region b virtually surrounded by a specified circumscribing rectangular shape is blacked out. That is, the CPU 40 executes a display control where the brightness of a portion of the reference image 200 which overlaps with the inside of the operation region b surrounded by the specified circumscribing rectangular shape is set to zero (step S103).

In step S104, the CPU 40 displays the reference image 200 on the display part 1 through the HMD-use controller 32 as if the operation region b virtually surrounded by the specified circumscribing rectangular shape is cut away from the image display region a by the processing executed in step S103. On the other hand, in step S101, the CPU 40 displays the content stored in the HMD-use VRAM 33 as it is through the HMD-use controller 32 when either the left hand 103 or the right hand 103 is not detected.

Due to such processing, when the CCD camera 2 detects both left and right hands 103, 103 of the user 100, as shown in FIG. 6B, the dot marks 201 and the line 202 which are disposed between the left and right hands 103, 103 are not displayed. Accordingly, the visibility of the terminals T which are wiring objects in the wiring operation part D1 is remarkably enhanced so that the user 100 can easily insert the banana plugs 110, 110 held by the left and right hands 103, 103 into the terminals T.

In step S105, the CPU 40 determines whether or not the content display switch is turned off so that a content display finish command is issued. When the CPU 40 determines that the content display finish command is not yet issued (step S105: No), the CPU 40 repeats processing in steps ranging from step S100 to step S104. On the other hand, when the CPU 40 determines that the content display finish command is issued (step S105: Yes), the CPU 40 finishes the display control processing.

In this manner, according to the HMD of this embodiment, when the user 100 performs a predetermined operation (wiring operation in this embodiment) while visually recognizing the reference image 200 displayed by the display part 1, the visibility of the reference image 200 in the operation region b between both hands 103, 103 of the user 100 is automatically reduced without requiring a switching operation. Accordingly, the visibility of the wiring operation part D1 which constitutes ambient scenery is enhanced and hence, the possibility that reference image 200 disturbs the wiring operation is eliminated whereby the operation efficiency is enhanced and, at the same time, the safety of the operation is also enhanced.

A modification of the display control processing is explained in conjunction with FIG. 10.

In this modification, when the main controller 31 determines that the operation region b is defined between both hands 103, the brightness of the reference image 200 displayed in the operation region b in an overlapping manner is not set to zero unconditionally. Instead, in this modification, the degree of reduction of visibility of the reference image 200 for the user 100 in the operation region b is changed corresponding to a mode of the operation region b which is subject to the operation-region presence determination. Due to such processing, the modification can acquire both the enhancement of the operability of the wiring operation and the enhancement of reference property of the reference image 200.

With respect to the mode of the operation region b, for example, the degree of reduction of visibility can be changed corresponding to a magnitude of an area of the operation region b. In a first condition where an area A of the operation region b between the detected left and right hands 103, 103 exceeds a predetermined first comparison area A1 (A>A1), the degree of reduction of visibility of a first level is set. In a second condition where the area A of the operation region b is not larger than the first comparison area A1 and larger than a second comparison area A2 (A1≧A>A2), the degree of reduction of visibility of a second level is set. In a third condition where the area A of the operation region b is not larger than the second comparison area A2 and larger than a third comparison area A3 (A2≧A>A3), the degree of reduction of visibility of a third level is set. Then, a table which preliminarily associates the above-mentioned respective conditions with the degree of reduction of visibility is prepared and the table is stored in the flash ROM 42.

For example, in an operation for connecting the terminal T arranged at the coordinates (3,E) and the terminal T arranged at the coordinates (5,F) to each other using a line, as shown in FIG. 10A, assume that written operation instructions saying "connect (3,E) and (5-F) using red plugs" is displayed as the reference image 200. To confirm the terminals T which constitute connection objects by visually recognizing the written operation instructions displayed in the operation region b defined between the left hand 103 and the right hand 103, the user 100 places his hands 103, 103 in a state where both hands 103, 103 are separated from each other. Here, left and right hand s 103, 103 are arranged close to edges of the image display region a so that the operation region b covers a wide range. When this operation region b satisfies the first condition, the CPU 40 reduces the degree of reduction of visibility of the reference image 200 for the user 100 at the first level. Accordingly, the user 100 can clearly visually recognize a content of the written operation instruction so that the user 100 can confirm the positions of the terminals T to be connected to each other using red banana plugs 110.

The user 100 who confirmed the positions of the terminals T to be connected to each other based on the written operation instructions, as shown in FIG. 10B, moves his left and right hands 103, 103 such that these hands 103, 103 approach the terminal T positioned at the coordinates (3,E) and the terminal T positioned at the coordinates (5,F) from the positions arranged close to edges of the image display region a. Along with such movement of left and right hands 103, 103, the distance between the left and right hands 103, 103 becomes narrow so that an area of the operation region b defined between the left and right hands 103, 103 also becomes smaller by one size. When the CPU 40 determines that the operation region b satisfies the second condition, the CPU 40 lowers the degree of reduction of the reference image 200 for the user 100 to the second level. To be more specific, the brightness of the letters which form the written operation instructions is lowered to approximately 50%. In such a state, although the letters of the written operation instructions may disturb the wiring operation, the letters are displayed with light color and fine lines and hence, the written operation instructions does not largely disturb the wiring operation.

Then, assume that the banana plugs 110 held by left and right hands 103, 103 of the user 100 approach the terminal T arranged at the coordinates (3,E) and the terminal T arranged at the coordinates (5,F) so that the distance between the left and right hands 103, 103 becomes narrower whereby the area of the operation region b defined between the left hand 103 and the right hand 103 satisfies the third condition. In this case, the CPU 40 further lowers the degree of reduction of visibility of the reference image 200 for the user 100 to the third level. To be more specific, the CPU 40 reduces the brightness of the letters which form the written operation instructions to approximately 80%. In such a state, the letters are displayed with extremely light color and extremely fine lines such that the letters are hardly viewable and hence, there is no possibility that the written operation instructions disturbs the wiring operation for the user 100.

In this manner, in the example shown in FIG. 10A and FIG. 108, the CPU 40 perform a display control such that the larger the area of the operation region b becomes, the smaller the possibility that the reference image 200 disturbs the wiring operation becomes gradually.

3. Another Embodiment

In the above-mentioned embodiment, the main controller 31 which functions as the hand detection unit surrounds left and right hands 103, 103 by the circumscribing rectangular shape and recognizes the surrounded region as the operation region b. However, the recognition of the operation region b is not limited to such recognition. As another embodiment, as shown in FIG. 11A and FIG. 11B, a region which is defined between a finger 104 of one hand 103 and a finger 104 of the other hand 103 is determined as a variable operation region c.

Figure 11A:
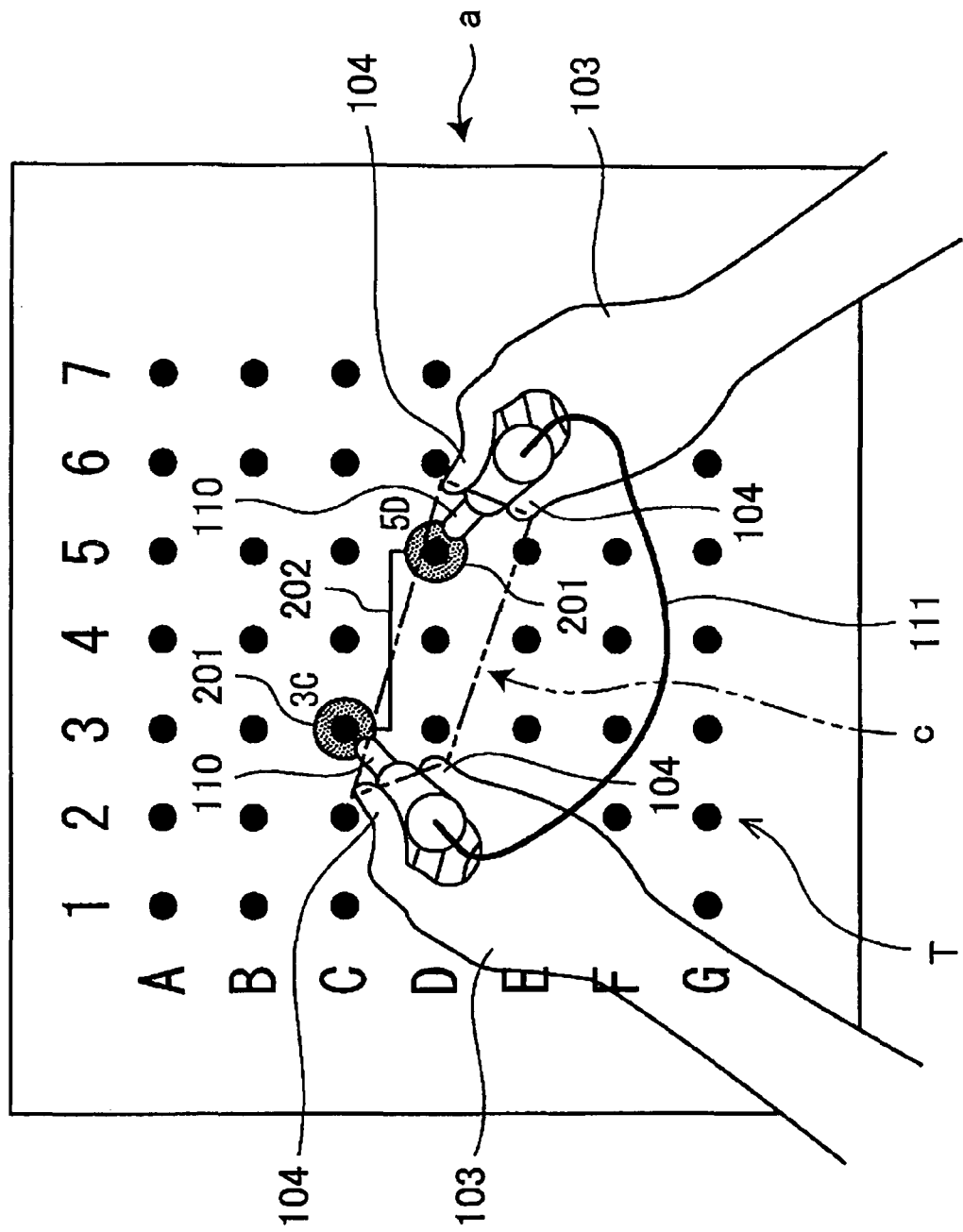

In this case, in a state shown in FIG. 11A, the variable operation region c which is defined between the index finger 104 and the thumb 104 of the left hand 103 and the index finger 104 and the thumb 104 of the right hand 103 has a flat and narrow range. Accordingly, dot marks 201 and a line 202 in the reference image 200 are out of the variable operation region c and hence, the display of the dot mark 201 and the line 202 are maintained.

When the user 100 feels that the dot marks 201 and the line 202 disturb the wiring operation and wants to lower the visibility of the dot marks 201 and the line 202, as shown in FIG. 11B, the user 100 may change the fingers 104 which hold the banana plugs 110. When the user 100 raises his left and right index fingers 104, 104, for example, the CPU 40 detects that the variable operation region c is enlarged in the vertical direction and, at the same time, detects that the dot marks 201 and the line 202 fall within the variable operation region c. Accordingly, as shown in the drawing, the CPU 40 reduces the brightness of the dot marks 201 and the line 202 in the variable operation region c so as to reduce visibility of the dot marks 201 and the line 202 for the user 100 so that the visibility of ambient scenery (for example, an operation object such as a wiring operation part) can be enhanced to the contrary.

In this manner, according to this embodiment, even during the user 100 performs the wiring operation, the user 100 can arbitrarily change an area and a shape of the variable operation region c by moving his fingers 104. Due to this change of a mode of the variable operation region c, the degree of reduction of the visibility of the reference image 200 can be changed. Accordingly, when there is the reference image 200 which the user 100 wants to reduce the visibility thereof, the user 100 can lower the visibility of the reference image 200 which becomes a target by a simple operation that the user 100 moves his fingers 104. Accordingly, the degree of freedom that the user 100 can change the degree of reduction of visibility of the reference image 200 is increased and hence, the user friendliness of the HMD can be enhanced.

In the above-mentioned embodiment, when the main controller 31 detects the left and right hands 103, 103, the visibility of the reference image 200 is reduced based on the predetermined conditions. However, it may be possible to provide an exceptional prescription.

For example, when a state of the hands 103, 103 detected by the main controller 31 satisfies a predetermined condition, the visibility reduction processing is interrupted. Such a predetermined condition is that, for example, a distance between one hand 103 and the other hand 103 detected by the main controller 31 is set to a predetermined distance or more.

By providing the exceptional prescription with respect to the processing of reducing the visibility of the reference image 200, for example, in the course of the wiring operation, the user 100 can confirm the wiring operation by redisplaying the reference image 200 whose visibility is lowered or eliminated.

For example, in the visibility reduction processing explained in conjunction with FIG. 10, in a state shown in FIG. 10A, when the distance between the left hand 103 and the right hand 103 is not less than a predetermined distance, the reduction of visibility is interrupted. That is, the first level of the degree of reduction may include a case where the degree of reduction is set to zero.

Further, the main controller 31 may determine that a predetermined condition is satisfied when a position of at least one detected hand out of left and right hands 103 falls within a predetermined distance range which includes a focal length F of the CCD camera 2, and may interrupt the reduction of visibility based on such determination.

Here, the predetermined distance range which includes the focal length of the CCD camera 2 may be, for example, a range which exceeds the focal length of the CCD camera 2 and is spaced apart from the wiring operation part by a fixed distance or more (for example, within the distance up to the CCD camera 2). By setting the predetermined distance range in such a manner, when the hand 103 falls within the range, the main controller 31 interrupts the visibility reduction processing which reduces the brightness of the reference image 200.

Figure 12A:
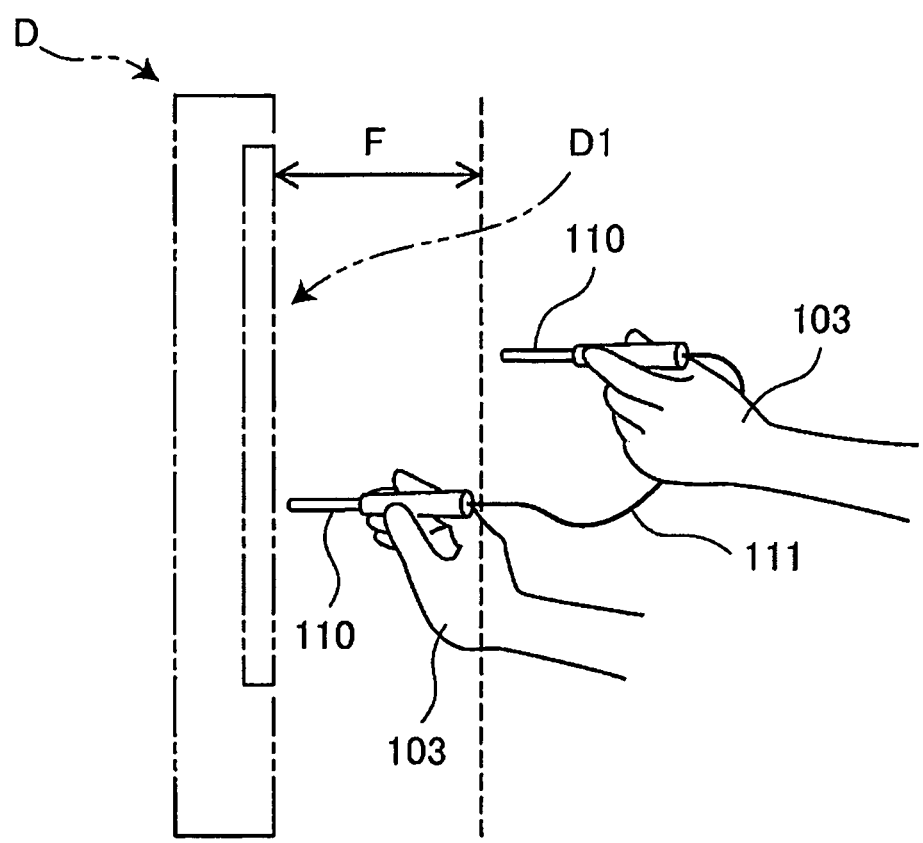
FIG. 12A and FIG. 12B are explanatory views showing an exception of the control for reducing visibility of a reference image.
Figure 12B:
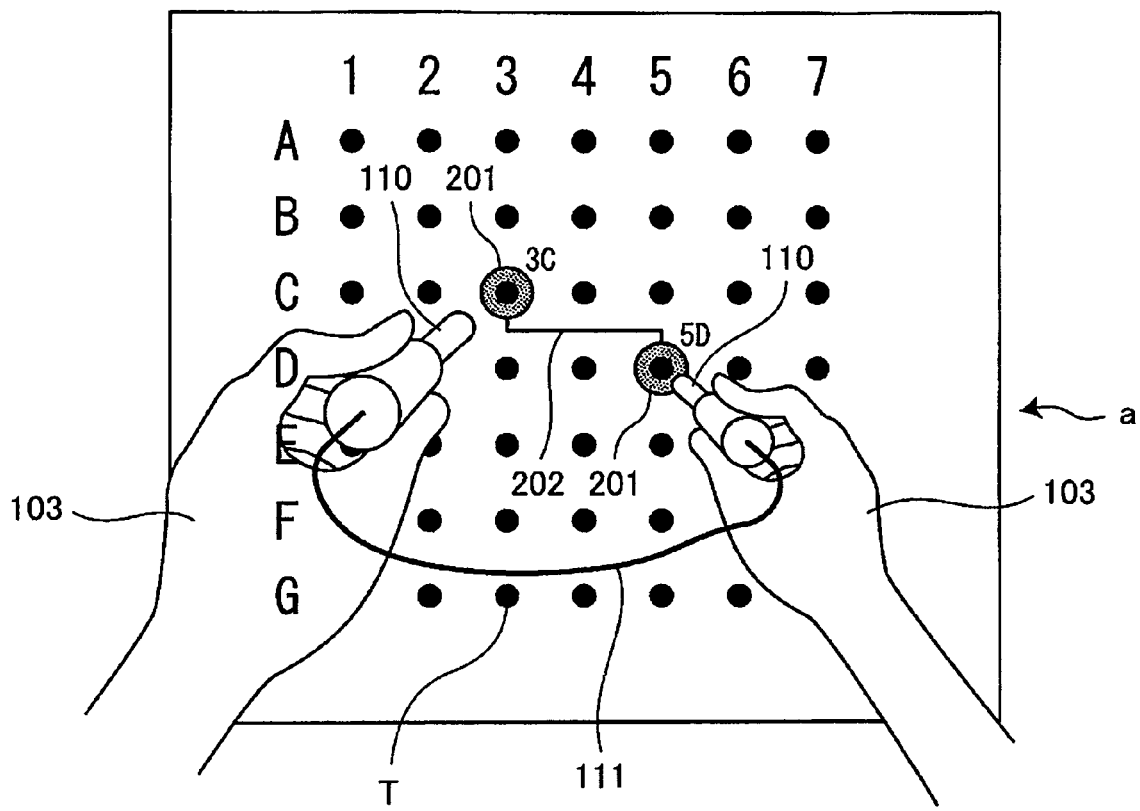

For example, when the left hand 103 falls outside a range of the focal length F of the CCD camera 2 but within the imaging range of the CCD camera 2 as shown in FIG. 12A, it is determined that the wiring operation is not performed and hence, the CPU 40 of the main controller 31 interrupts the visibility reduction processing which reduces the brightness of the reference image 200 so that the reference image 200 is clearly displayed as in the case of the usual display as shown in FIG. 12B.

A state where the hand 103 falls outside the range of the focal length F of the CCD camera 2 can be detected by executing following steps. That is, when the hand 103 falls outside the range of the focal length F of the CCD camera 2, the hand 103 approaches the CCD camera 2. Accordingly, as shown in FIG. 12B, an area of a region which is formed of a mass of pixels having skin color (hereinafter referred to as "skin color region") indicative of one hand 103 (left hand 103 here) is changed in an expanding direction. The CPU 40 detects this change of the area of the skin color region and determines that the hand 103 falls outside the range of the focal length F of the CCD camera 2. The area of the skin color region may also be changed corresponding to a change of an angle of the hand 103 or the like. Accordingly, it is desirable to determine that the hand 103 falls outside the range of the focal length F of the CCD camera 2 by also taking the resolution distribution of the skin color region into consideration as a factor for such determination in addition to the area of the skin color region.

Also in this case, when the user 100 wants to redisplay the reference image 200 because of necessity of confirming something during the wiring operation, the reference image 200 is readily displayed by moving one hand 103 toward a user's body side.

Although the present invention has been explained heretofore in conjunction with several embodiments, the present invention is not limited to such embodiments. For example, although the brightness of the reference image 200 is reduced when the user 100 wants to reduce the visibility of the reference image 200 for the user 100, it is possible to reduce the visibility of the reference image 200 by changing a display color of the reference image 200. Further, the above-mentioned respective advantageous effects are merely the enumeration of most preferable advantageous effects obtained by the present invention, and advantageous effects acquired by the present invention are not limited to the advantageous effects acquired by the embodiments.

What is claimed is:

1. A head mount display comprising:
    a display configured to allow an image light corresponding to image information to be incident on an eye of a user together with an ambient light thus displaying an image corresponding to the image information in an overlapping manner with ambient scenery;
    a controller configured to:
        image a range which includes at least a display region provided by the display out of a field of view of the user;
        detect hands of the user by analyzing the imaged image;
        perform a control in which a reference image which is used as a reference when the user performs a predetermined operation is displayed by the display;
        determine a region which is formed between one detected hand and the other detected hand of the user
        reduce visibility of the determined region out of the reference image displayed by the display for the user; and
        change a degree of reduction of visibility of the region for the user corresponding to a mode of the determined region.

2. The head mount display according to claim 1, wherein the controller is configured to reduce the visibility by reducing brightness of an image in the region determined by the determination unit.

3. The head mount display according to claim 1, wherein the controller is configured to set brightness of an image in the determined region to zero.

4. The head mount display according to claim 1, wherein the controller is configured to set a region defined between a finger of the one detected hand and a finger of the other detected hand as the determined region.

5. The head mount display according to claim 1, wherein the controller is configured, even when the one detected hand and the other detected hand are detected during a display control executed by the display, to interrupt the reduction of the visibility provided that a state of the detected hand satisfies a predetermined condition.

6. The head mount display according to claim 5, wherein the controller is configured to determine that the predetermined condition is satisfied when a distance between the one detected hand and the other detected hand is not less than a predetermined distance.

7. The head mount display according to claim 5, wherein the controller is configured to determine that the predetermined condition is satisfied when a position of the detected hand falls within a predetermined distance range including a focal length of the imaging unit.

8. A non-transitory computer-readable medium storing computer-executable instructions that execute in a processor a method comprising:
    a display step of allowing an image light corresponding to image information to be incident on an eye of a user together with an ambient light thus displaying an image corresponding to the image information in an overlapping manner with ambient scenery;
    an imaging step of imaging a range which includes at least a display region provided at the display step of a field of view of the user;
    a hand detection step of detecting hands of the user by analyzing the image imaged at the imagining step;
    a performing step of performing a control in which a reference image which is used as a reference when the user performs a predetermined operation is displayed; and
    a determination step of determining a region which is formed between one hand and the other hand of the user detected at the hand detection step, wherein
    the visibility is reduced of the region determined at the determination step out of the reference image displayed by the display for the user and a degree of reduction of visibility is changed for the region corresponding to a mode of the region defined by the positional relationship between one hand and the other hand of a user determined at the determination step.

* * * * *